United States Patent
Mokuya

(10) Patent No.: US 10,529,133 B2
(45) Date of Patent: Jan. 7, 2020

(54) HEAD MOUNTED DISPLAY APPARATUS AND CONTROL METHOD THEREFOR, AND COMPUTER PROGRAM

(71) Applicant: SEIKO EPSON CORPORATION, Tokyo (JP)

(72) Inventor: Senichi Mokuya, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/519,920

(22) PCT Filed: Oct. 15, 2015

(86) PCT No.: PCT/JP2015/005216
§ 371 (c)(1),
(2) Date: Apr. 18, 2017

(87) PCT Pub. No.: WO2016/063504
PCT Pub. Date: Apr. 28, 2016

(65) Prior Publication Data
US 2017/0323479 A1  Nov. 9, 2017

(30) Foreign Application Priority Data
Oct. 20, 2014  (JP) .................................. 2014-213442

(51) Int. Cl.
*G06T 19/00* (2011.01)
*G02B 27/01* (2006.01)

(52) U.S. Cl.
CPC ........ *G06T 19/003* (2013.01); *G02B 27/0172* (2013.01); *G02B 27/0179* (2013.01);
(Continued)

(58) Field of Classification Search
None
See application file for complete search history.

(56) References Cited

U.S. PATENT DOCUMENTS 9,489,739 B2 * 11/2016 Kruglick ................ G06T 7/0044
9,691,241 B1 * 6/2017 Braun .............. G08B 13/19621
(Continued)

FOREIGN PATENT DOCUMENTS

JP  2007-213407 A  8/2007
JP  2011-221800 A  11/2011

OTHER PUBLICATIONS

Dec. 8, 2015 International Search Report issued in International Patent Application No. PCT/JP2015/005216.
(Continued)

*Primary Examiner* — Saptarshi Mazumder
(74) *Attorney, Agent, or Firm* — Oliff PLC

(57) ABSTRACT

A head mounted display apparatus includes a display unit by which an outside world can be transmissively visually recognized, including: a superimposition image display control part that allows the display unit to display predetermined images in correspondence with positions of subjects in the outside world transmissively visually recognized, a view range movement information acquisition part that acquires view range movement information representing a motion of the display unit, and a subject movement information acquisition part that acquires subject movement information representing a relative motion of the subject to the display unit. When the acquired view range movement and acquired subject movement information are substantially not matched, the superimposition image display control part estimates a relative position of the subject to the display unit after a predetermined time based on at least the subject movement information, and determines a display position of the predetermined image based on the estimated relative position.

11 Claims, 14 Drawing Sheets

(52) U.S. Cl.
CPC ...... *G06T 19/006* (2013.01); *G02B 2027/014* (2013.01); *G02B 2027/0123* (2013.01); *G02B 2027/0187* (2013.01)

(56) References Cited

U.S. PATENT DOCUMENTS

| | | | |
|---|---|---|---|
| 2008/0279421 A1* | 11/2008 | Hamza | B64G 1/646 |
| | | | 382/103 |
| 2011/0249862 A1 | 10/2011 | Tokikura et al. | |
| 2012/0268490 A1 | 10/2012 | Sugden | |
| 2013/0177296 A1* | 7/2013 | Geisner | H04N 9/80 |
| | | | 386/241 |
| 2013/0187835 A1* | 7/2013 | Vaught | G06K 9/00604 |
| | | | 345/8 |
| 2013/0257690 A1 | 10/2013 | Fujimaki | |
| 2014/0237085 A1* | 8/2014 | Park | G06Q 50/10 |
| | | | 709/219 |
| 2015/0002394 A1* | 1/2015 | Cho | G02B 27/0093 |
| | | | 345/156 |
| 2015/0352437 A1* | 12/2015 | Koseki | A63F 13/212 |
| | | | 463/31 |

OTHER PUBLICATIONS

Mar. 26, 2018 Extended European Search Report issued in European Patent Application No. 15852666.5.
You et al., Suya, "Hybrid Inertial and Vision Tracking for Augmented Reality Registration," Virtual Reality, 1999, Proceedings, IEEE Houston, TX, USA, Mar. 13-17, 1999, pp. 260-267.

* cited by examiner

*FIG.13*
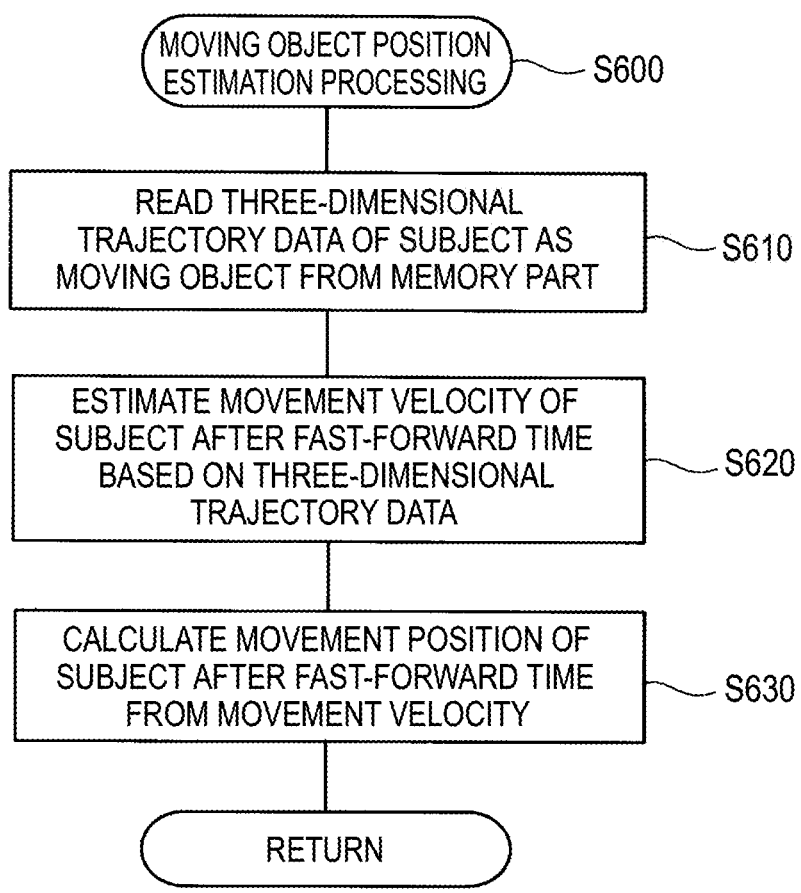
*FIG.14A*      *FIG.14B*
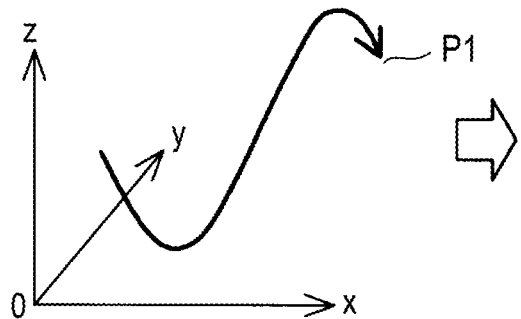
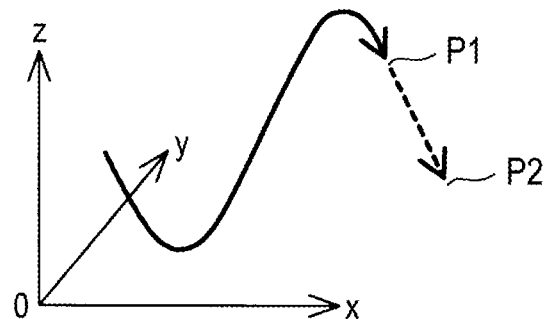

| MARKER IDENTIFICATION NUMBER (C1) | DISPLAY CONTENT (C2) | DISPLAY ATTRIBUTE (C3) | | DISPLAY RELATIVE POSITION (C4) |
|---|---|---|---|---|
| | | BALLOON COLOR (C31) | CHARACTER SIZE (C32) | |
| 001 | CHAIR (TEXT) | YELLOW | 10 | (3,36)-(45,50) |
| 002 | MR. SOMEONE (TEXT) | LIGHT BLUE | 10 | (-45,28)-(-3,-50) |
| ⋮ | ⋮ | ⋮ | ⋮ | ⋮ |

HEAD MOUNTED DISPLAY APPARATUS AND CONTROL METHOD THEREFOR, AND COMPUTER PROGRAM

TECHNICAL FIELD

This invention relates to a head mounted display apparatus including a display unit by which an outside world can be transmissively visually recognized and a control method therefor, and a computer program.

BACKGROUND ART

Recently, a technology called augmented reality (AR) of adding information by a computer to an object in a real space has attracted attention. As one of techniques for realizing the augmented reality, there is a see-through-type head mounted display apparatus by which an outside world can be transmissively visually recognized. According to the see-through-type head mounted display apparatus, image lights generated by a light modulation device such as a liquid crystal panel are reflected by an optical system placed in front of an eye of a user or the like, and thereby, augmented information as augmented reality may emerge in the outside world transmissively visually recognized as an image.

In a typical IT apparatus, a slight processing time (delay time) is taken for displaying an image, and the same applies to the head mounted display apparatus. For example, when a user of the head mounted display apparatus facing the front makes an action of turning to the side, image display is performed with a slight delay from the motion of the outside world being visually recognized. Accordingly, misregistration occurs between a subject in the outside world transmissively visually recognized and augmented information displayed in correspondence with the position of the subject, and the user recognizes it as a display delay.

In order to solve the above described problem, in related art, PTL 1 is proposed. According to the technology described in PTL 1, the above described display delay may be solved by generating a larger image than an area to be displayed and detecting the motion of the head of the user in the delay time using a gyro sensor, calculating how much the generated image delays with respect to the motion of the head, and changing a cutout position as a display image from the generated image by the amount of delay.

CITATION LIST

Patent Literature

PTL 1: JP-A-2007-213407

SUMMARY OF INVENTION

Technical Problems

However, the technology of related art is only to solve the display delay in response to the motion of the head of the user. For example, when a subject as an object moves every second, occurrence of misregistration between the subject and augmented information displayed in correspondence with the position of the subject in the delay time is unchanged. Accordingly, there is a problem that it is impossible to solve the misregistration between the subject and the augmented information. In addition, in the head mounted display apparatus of related art, improvement in convenience for the user, improvement in detection accuracy, downsizing of the apparatus configuration, cost reduction, resource saving, facilitation of manufacturing, etc. are desired.

Solution to Problems

The invention has been achieved for solving at least part of the above described problems and can be realized as the following aspects.

(1) An aspect of the invention is a head mounted display apparatus including a display unit by which an outside world can be transmissively visually recognized. The head mounted display apparatus may include a superimposition image display control part that allows the display unit to display a predetermined image in correspondence with a position of a subject in the outside world transmissively visually recognized, a view range movement information acquisition part that acquires view range movement information representing a motion of the display unit, and a subject movement information acquisition part that acquires subject movement information representing a relative motion of the subject to the display unit. When the acquired view range movement information and the acquired subject movement information are substantially not matched, the superimposition image display control part may estimate a relative position of the subject to the display unit after a predetermined time based on at least the subject movement information, and determine a display position of the predetermined image based on the estimated relative position. According to the head mounted display apparatus of the aspect, in the case where the subject is a moving object relatively moving to the display unit independent of the motion of the display unit, the predetermined image may be displayed in correspondence with the estimated position of the subject after the predetermined time. Therefore, in the case where the subject is the moving object, misregistration between the subject and the predetermined image occurring in the predetermined time may be solved.

(2) In the head mounted display apparatus of the aspect, the predetermined image may be augmented information as augmented reality provided to the subject. According to the head mounted display apparatus of the aspect, the misregistration between the subject and the augmented information as augmented reality provided to the subject may be solved.

(3) In the head mounted display apparatus of the aspect, when the acquired view range movement information and the acquired subject movement information are substantially matched, the superimposition image display control part may estimate a relative position of the subject to the display unit after a predetermined time based on the view range movement information, and determine a display position of the predetermined image based on the estimated relative position. According to the head mounted display apparatus of the aspect, even in the case where the subject is a still object relatively moving to the display unit depending only on the motion of the display unit, the misregistration between the subject and the predetermined image may be solved.

(4) In the head mounted display apparatus of the aspect, the view range movement information acquisition part may have a motion sensor provided in the display unit. According to the head mounted display apparatus of the aspect, the motion of the display unit may be detected with high accuracy.

(5) In the head mounted display apparatus of the aspect, the subject movement information acquisition part may have an RGB sensor and a depth sensor provided in the display unit. According to the head mounted display apparatus of the aspect, the relative movement of the moving object to the display unit may be detected with high accuracy.

(6) In the head mounted display apparatus of the aspect, the subject movement information acquisition part may receive a detection signal of a motion sensor provided in the subject in advance via wireless communication. According to the head mounted display apparatus of the aspect, the relative movement of the moving object to the display unit may be detected with high accuracy.

(7) In the head mounted display apparatus of the aspect, the subject movement information acquisition part may receive a signal from a wireless communication terminal provided in the subject in advance. According to the head mounted display apparatus of the aspect, the relative movement of the moving object to the display unit may be detected with high accuracy.

(8) In the head mounted display apparatus of the aspect, an adjustment part that varies the predetermined time may be provided. According to the head mounted display apparatus of the aspect, the misregistration between the subject and the predetermined image occurring in the predetermined time may be solved more reliably.

(9) In the head mounted display apparatus of the aspect, an information provision part that transmits the view range movement information to another head mounted display apparatus may be provided. According to the head mounted display apparatus of the aspect, the motions of the mutual display units may be exchanged between the other head mounted display apparatus and itself by the simple configuration.

(10) Another aspect of the invention is a head mounted display apparatus. The head mounted display apparatus may include a display unit by which an outside world can be transmissively visually recognized, and a superimposition image display control part that allows the display unit to display a predetermined image, in either case where a subject in the outside world is a moving object relatively moving to the display unit independent of a motion of the display unit or a still object relatively moving to the display unit depending only on the motion of the display unit, in correspondence with a relative position of the subject to the display unit after a predetermined time. According to the head mounted display apparatus of the aspect, in either case where the subject relatively moves to the display unit independent of the motion of the display unit or the subject relatively moves to the display unit depending only on the motion of the display unit, the misregistration between the subject and the predetermined image generated may be solved.

Not all of the pluralities of component elements of the above described respective aspects of the invention are essential. In order to solve part or all of the above described problems or achieve part or all of the advantages described in the specification, regarding partial component elements of the plurality of component elements, changes, deletions replacement by new other components, partial deletion of limitations can be made as appropriate. Further, in order to solve part or all of the above described problems or achieve part or all of the advantages described in the specification, part or all of technical features contained in the above described one aspect of the invention may be combined with part or all of technical features contained in the above described other aspect of the invention, and thereby, one independent aspect of the invention can be obtained.

For example, one aspect of the invention can be realized as an apparatus including one or more elements of four elements of the display unit, the superimposition image display control part, the view range movement information acquisition part, and the subject movement information acquisition part. That is, the apparatus may have the display unit or not. Or, the apparatus may have the superimposition image display control part or not. Or, the apparatus may have the view range movement information acquisition part or not. Or, the apparatus may have the subject movement information acquisition part or not. For example, the display unit may be a unit by which an outside world can be transmissively visually recognized. For example, the superimposition image display control part may allow the display unit to display a predetermined image in correspondence with a position of a subject in the outside world transmissively visually recognized. For example, the view range movement information acquisition part may acquire view range movement information representing a motion of the display unit. For example, the subject movement information acquisition part may represent a relative motion of the subject to the display unit. Further, for example, when the acquired view range movement information and the acquired subject movement information are substantially not matched, the superimposition image display control part may estimate a relative position of the subject to the display unit after a predetermined time based on at least the subject movement information, and determine a display position of the predetermined image based on the estimated relative position. For example, the apparatus may be realized as a head mounted display apparatus or can be realized as another apparatus than the head mounted display apparatus. According to the aspect, at least one of various problems of improvement in convenience for the user, improvement in detection accuracy, downsizing of the apparatus configuration, cost reduction, resource saving, facilitation of manufacturing, etc. may be solved. Part or all of the technical features of the respective aspects of the above described head mounted display apparatus can be applied to the apparatus.

For example, another aspect of the invention can be realized as an apparatus including one or more elements of two elements of the display unit and the superimposition image display control part. That is, the apparatus may have the display unit or not. Or, the apparatus may have the superimposition image display control part or not. For example, the display unit may be a unit by which an outside world can be transmissively visually recognized. For example, the superimposition image display control part may allow the display unit to display a predetermined image, in either case where a subject in the outside world is a moving object relatively moving to the display unit independent of a motion of the display unit or a still object relatively moving to the display unit depending only on the motion of the display unit, in correspondence with a relative position of the subject to the display unit after a predetermined time. For example, the apparatus may be realized as a head mounted display apparatus or can be realized as another apparatus than the head mounted display apparatus. According to the aspect, at least one of various problems of improvement in convenience for the user, improvement in detection accuracy, downsizing of the apparatus configuration, cost reduction, resource saving, facilitation of manufacturing, etc. may be solved. Part or all of the technical features of the respective aspects of the above described head mounted display apparatus can be applied to the apparatus.

The invention can be realized in other various aspects than the head mounted display apparatus. For example, the invention can be realized in aspects of a display device, a head mounted display apparatus and a control method for a display device, a display device, a head mounted display system, and a computer program for realizing functions of the head mounted display system and the display device, a recording medium in which the computer program is recorded, a data signal embodied within carrier wave including the computer program, etc.

BRIEF DESCRIPTION OF DRAWINGS

FIG. 13 is a flowchart showing details of moving object position estimation processing.

FIG. 14 is an explanatory diagram conceptually showing a change of the movement position obtained by the moving object position estimation processing.

DESCRIPTION OF EMBODIMENT

A. First Embodiment

Figure 1:
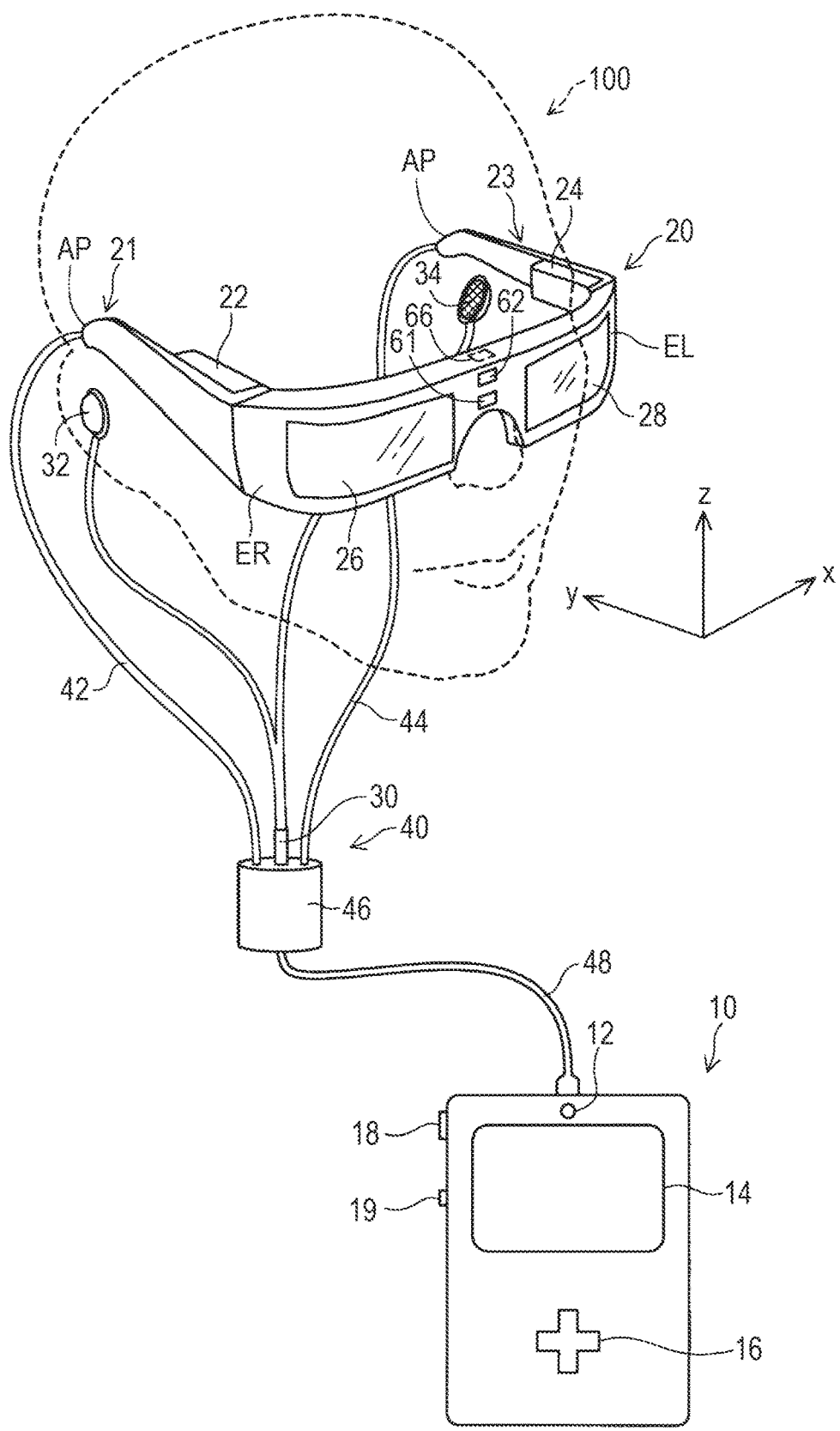
FIG. 1 is an explanatory diagram showing a schematic configuration of a head mounted display apparatus (HMD) in the first embodiment of the invention.

A-1: Basic Configuration of Head Mounted Display Apparatus:

FIG. 1 is an explanatory diagram showing a schematic configuration of a head mounted display apparatus in the first embodiment of the invention. The head mounted display apparatus 100 is a display worn on a head and also called a head mounted display (HMD). The HMD 100 is a see-through-type head mounted display apparatus by which an image emerges in an outside world transmissively visually recognized through a glass.

The HMD 100 includes an image display unit 20 that allows a user to visually recognize a virtual image when worn on a head of the user and a control unit (controller) 10 that controls the image display unit 20.

The image display unit 20 is an attachment unit to be attached to the head of the user and has a spectacle shape in the embodiment. The image display unit 20 includes a right holding part 21, a right display drive part 22, a left holding part 23, a left display drive part 24, a right optical image display part 26, and a left optical image display part 28. The right optical image display part 26 and the left optical image display part 28 are provided to be located in front of right and left eyes of the user, respectively, when the user wears the image display unit 20. One end of the right optical image display part 26 and one end of the left optical image display part 28 are connected to each other in positions corresponding to the glabella of the user when the user wears the image display unit 20.

The right holding part 21 is a member provided to extend from an end portion ER as the other end of the right optical image display part 26 to a position corresponding to the temporal part of the user when the user wears the image display unit 20. Similarly, the left holding part 23 is a member provided to extend from an end portion EL as the other end of the left optical image display part 28 to a position corresponding to the temporal part of the user when the user wears the image display unit 20. The right holding part 21 and the left holding part 23 hold the image display unit 20 on the head of the user like temples of spectacles.

The right display drive part 22 is provided inside of the right holding part 21, in other words, on a side facing the head of the user when the user wears the image display unit 20. Further, the left display drive part 24 is provided inside of the left holding part 23. Note that, as below, the right holding part 21 and the left holding part 23 will be explained as "holding parts" without distinction. Similarly, the right display drive part 22 and the left display drive part 24 will be explained as "display drive parts" without distinction, and the right optical image display part 26 and the left optical image display part 28 will be explained as "optical image display parts" without distinction.

The display drive parts include liquid crystal displays (hereinafter, referred to as "LCDs") 241, 242, projection systems 251, 252, etc. (see FIG. 2). The details of the configurations of the display drive parts will be described later. The optical image display parts as optical members include light guide plates 261, 262 (see FIG. 2) and dimmer plates. The light guide plates 261, 262 are formed using a light-transmissive resin material or the like and guide image lights output from the display drive parts to the eyes of the user. The dimmer plates are thin plate-like optical elements and provided to cover the front side of the image display unit 20 (the opposite side to the eyes of the user). The dimmer plates protect the light guide plates 261, 262 and suppress damage, adhesion of dirt, etc. of the light guide plates 261, 262. The light transmittance of the dimmer plates is adjusted, and thereby, ease of visual recognition of the virtual image may be adjusted by adjustment of amounts of outside light entering the eyes of the user. Note that the dimmer plates may be omitted.

The image display unit 20 further includes a connecting part 40 for connecting the image display unit 20 to the control unit 10. The connecting part 40 includes a main body cord 48 to be connected to the control unit 10, a right cord 42 and a left cord 44 formed by bifurcation of the main body cord 48, and a coupling member 46 provided at the bifurcation point. The right cord 42 is inserted into the casing of the right holding part 21 from an end portion AP of the right holding part 21 in the extension direction and connected to the right display drive part 22. Similarly, the left cord 44 is inserted into the casing of the left holding part 23 from an end portion AP of the left holding part 23 in the extension direction and connected to the left display drive part 24. A jack for connecting an earphone plug 30 is provided in the coupling member 46. A right earphone 32 and a left earphone 34 extend from the earphone plug 30.

The image display unit 20 and the control unit 10 transmit various signals via the connecting part 40. Connectors (not shown) fitting in each other are respectively provided in the end in the main body cord 48 opposite to the coupling member 46 and the control unit 10, and the control unit 10 and the image display unit 20 are connected or separated by fitting or releasing fitting of the connector of the main body cord 48 and the connector of the control unit 10. For the right cord 42, left cord 44, and main body cord 48, e.g. metal cables or optical fibers may be employed.

The control unit 10 is a device for controlling the HMD 100. The control unit 10 includes a lighting part 12, a touch pad 14, an arrow key 16, and a power switch 18. The lighting part 12 informs the user of the operation status (e.g. ON/OFF of power or the like) of the HMD 100 by the light emission mode. As the lighting part 12, e.g. an LED (Light Emitting Diode) may be used. The touch pad 14 detects a contact operation on the operation surface of the touch pad 14 and outputs a signal according to the detection result. As the touch pad 14, various touch pads of electrostatic type, pressure detection type, optical type, etc. may be employed. The arrow key 16 detects a press-down operation on the key corresponding to upward, downward, leftward, rightward directions, and outputs a signal according to the detection result. The power switch 18 switches the status of the power of the HMD 100 by detecting a sliding operation of the switch.

Figure 2:
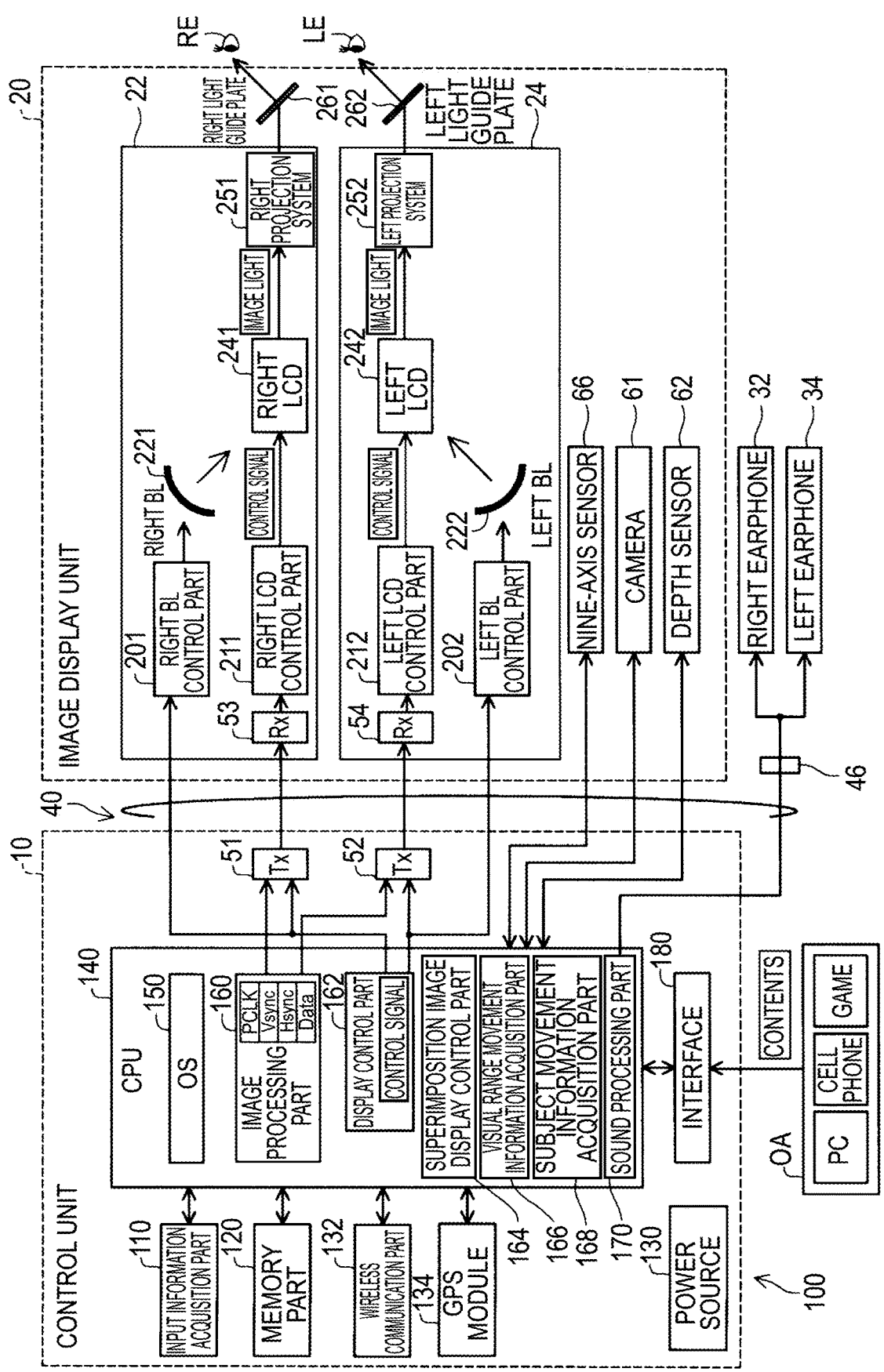
FIG. 2 is a block diagram functionally showing the configuration of the HMD.

FIG. 2 is a block diagram functionally showing the configuration of the HMD 100. The control unit 10 includes an input information acquisition part 110, a memory part 120, a power source 130, a wireless communication part 132, a GPS module 134, a CPU 140, an interface 180, and transmitting parts (Tx) 51 and 52, and the respective parts are mutually connected via a bus (not shown).

The input information acquisition part 110 acquires signals according to operation input to e.g. the touch pad 14, the arrow key 16, the power switch 18, etc. The memory part 120 includes a ROM, RAM, DRAM, or hard disk.

The power source 130 supplies electric power to the respective parts of the HMD 100. As the power source 130, e.g. a secondary cell such as a lithium polymer battery or lithium ion battery may be used. Further, in place of the secondary cell, a primary cell or fuel cell may be employed, or power may be wirelessly supplied for operation. Or, power may be supplied from a solar cell and a capacitor. The wireless communication part 132 preforms wireless communications between another apparatus and itself according to a predetermined wireless communication standard of wireless LAN, Bluetooth (registered trademark), or iBeacon (registered trademark). The GPS module 134 receives signals from a GPS satellite and detects its current location.

The CPU 140 reads and executes a computer program stored in the memory part 120, and thereby, functions as an operating system (OS) 150, an image processing part 160, a display control part 162, a superimposition image display control part 164, a view range movement information acquisition part 166, a subject movement information acquisition part 168, and a sound processing part 170.

The image processing part 160 generates a signal based on a content (picture) input via the interface 180 and the wireless communication part 132. Then, the image processing part 160 supplies the generated signal to the image display unit 20 via the connecting part 40, and thereby, controls the image display unit 20. The signal for supply to the image display unit 20 is different between the cases of an analog format and a digital format. In the case of the analog format, the image processing part 160 generates and transmits a clock signal PCLK, a vertical synchronizing signal VSync, a horizontal synchronizing signal HSync, and image data Data. Specifically, the image processing part 160 acquires an image signal contained in the content. For example, in the case of a moving picture, generally, the acquired image signal is an analog signal including thirty frame images per second. The image processing part 160 separates the synchronizing signals including the vertical synchronizing signal VSync and the horizontal synchronizing signal HSync from the acquired image signal, and generates the clock signal PCLK using a PLL circuit or the like in response to their cycles. The image processing part 160 converts the analog image signal from which the synchronizing signals have been separated into a digital image signal using an A/D conversion circuit or the like. The image processing part 160 stores the converted digital image signal in the DRAM within the memory part 120 with respect to each frame as image data Data of RGB data.

On the other hand, in the case of the digital format, the image processing part 160 generates and transmits the clock signal PCLK and the image data Data. Specifically, in the case where the content is in the digital format, the clock signal PCLK is output in synchronization with the image signal, and the generation of the vertical synchronizing signal VSync and the horizontal synchronizing signal HSync and the A/D conversion of the analog image signal are unnecessary. Note that the image processing part 160 may execute image processing such as resolution conversion processing, color tone correction processing including adjustment of brightness and saturation, and keystone correction processing on the image data Data stored in the memory part 120.

The image processing part 160 respectively transmits the generated clock signal PCLK, vertical synchronizing signal VSync, horizontal synchronizing signal HSync, and image data Data stored in the DRAM within the memory part 120 via the transmitting parts 51, 52. Note that the image data Data transmitted via the transmitting part 51 is also referred to as "right eye image data Data1" and the image data Data transmitted via the transmitting part 52 is also referred to as "left eye image data Data2". The transmitting parts 51, 52 function as transceivers for serial transmission between the control unit 10 and the image display unit 20.

The display control part 162 generates control signals for controlling the right display drive part 22 and the left display drive part 24. Specifically, the display control part 162 individually controls drive ON/OFF of a right LCD 241 by a right LCD control part 211, drive ON/OFF of a right backlight 221 by a right backlight control part 201, drive ON/OFF of a left LCD 242 by a left LCD control part 212, drive ON/OFF of a left backlight 222 by a left backlight control part 202, etc. using the control signals, and thereby, controls generation and output of image lights by the respective right display drive part 22 and left display drive part 24. The display control part 162 transmits the control signals for the right LCD control part 211 and the left LCD control part 212 via the transmitting parts 51, 52, respectively. Similarly, the display control part 162 respectively transmits the control signals for the right backlight control part 201 and the left backlight control part 202.

The superimposition image display control part 164 allows the display control part 162 to display a predetermined image, e.g., augmented information as augmented reality in the position of the subject in the outside world transmissively visually recognized. The view range movement information acquisition part 166 acquires view range movement information representing the motion of the image display unit 20. The subject movement information acquisition part 168 acquires subject movement information representing a relative motion of the subject to the image display unit 20. When the acquired view range movement information and the acquired subject movement information are substantially not matched, the superimposition image display control part 164 estimates a relative position of the subject to the image display unit 20 after a predetermined time based on at least the subject movement information, and determines the display position of the augmented information based on the estimated relative position. The respective parts 164, 166, 168 will be described later in detail.

The sound processing part 170 acquires sound signals contained in the content and amplifies the acquired sound signals, and supplies the signals to a speaker (not shown) within the right earphone 32 and a speaker (not shown) within the left earphone 34 connected to the coupling member 46. Note that, for example, in the case where the Dolby (registered trademark) system is employed, processing on the sound signals is performed and different sounds at different frequencies, for example, are output from the right earphone 32 and the left earphone 34.

The interface 180 is an interface for connecting various external apparatuses OA as supply sources of contents to the control unit 10. The external apparatuses OA include e.g. a personal computer PC, cell phone terminal, and game terminal. As the interface 180, e.g. a USB interface, micro USB interface, interface for memory card, or the like may be used.

The image display unit 20 includes the right display drive part 22, the left display drive part 24, the right light guide plate 261 as the right optical image display part 26, and the left light guide plate 262 as the left optical image display part 28, a camera 61 (see also FIG. 1), a depth sensor 62, and a nine-axis sensor 66.

The camera 61 is an RGB camera and provided in the position corresponding to the root of the nose of the user when the user wears the image display unit 20. Accordingly, the camera 61 performs color imaging of the outside world in a predetermined direction of the HMD 100, i.e., a direction in which the user faces when the user wears the image display unit 20 on the head of the user. Note that the camera 61 may be a monochrome camera in place of the RGB camera.

The depth sensor 62 is a kind of range sensor, and captures the outside world as a two-dimensional image and outputs a range image (depth map) showing depths in the respective pixels by grayscale. The depth sensor 62 is provided on the side of the camera 61. Note that the depth sensor 62 may be replaced by a stereo camera and the distances between the respective parts may be measured by the stereo camera.

The nine-axis sensor 66 is a motion sensor that detects accelerations (three axes), angular velocities (three axes), and geomagnetism (three axes), and provided in the position corresponding to the glabella of the user in the embodiment.

The nine-axis sensor 66 is provided in the image display unit 20, and detects the motion of the head of the user when the user wears the image display unit 20 on the head of the user. From the detected motion of the head, the direction in which the image display unit 20 faces, i.e., the view range of the user is specified.

The right display drive part 22 includes a receiving part (Rx) 53, the right backlight (BL) control part 201 and the right backlight (BL) 221 that function as a light source, the right LCD control part 211 and the right LCD 241 that function as a display device, and the right projection system 251. Note that the right backlight control part 201, the right LCD control part 211, the right backlight 221, and the right LCD 241 are also collectively referred to as "image light generation part".

The receiving part 53 functions as a receiver for serial transmission between the control unit 10 and the image display unit 20. The right backlight control part 201 drives the right backlight 221 based on the input control signal. The right backlight 221 is e.g. a light emitter such as an LED or electroluminescence (EL). The right LCD control part 211 drives the right LCD 241 based on the clock signal PCLK, vertical synchronizing signal VSync, horizontal synchronizing signal HSync, and right eye image data Data1 input via the receiving part 53. The right LCD 241 is a transmissive liquid crystal panel in which a plurality of pixels are arranged in a matrix form. The right LCD 241 drives the liquid crystal in the respective pixel positions arranged in the matrix form and changes the transmittance of the light transmitted through the right LCD 241, and thereby, modulates the illumination light radiated from the right backlight 221 to an effective image light representing an image.

The right projection system 251 includes a collimator lens that makes the image light output from the right LCD 241 to be a luminous flux in a parallel state. The right light guide plate 261 as the right optical image display part 26 reflects the image light output from the right projection system 251 along a predetermined optical path and guides the light to the right eye RE of the user. The optical image display part may use any method as long as the part forms a virtual image in front of the eye using the image light. For example, a diffraction grating may be used or a semi-transmissive reflection film may be used. Note that outputting the image light by the HMD 100 is also referred to as "displaying image" in the specification.

The left display drive part 24 has the same configuration as the right display drive part 22. That is, the left display drive part 24 includes a receiving part (Rx) 54, the left backlight (BL) control part 202 and the left backlight (BL) 222 that function as a light source, the left LCD control part 212 and the left LCD 242 that function as a display device, and the left projection system 252. Like the right LCD 241, the left LCD 242 drives the liquid crystal in the respective pixel positions arranged in the matrix form and changes the transmittance of the light transmitted through the left LCD 242, and thereby, modulates the illumination light radiated from the left backlight 222 to an effective image light representing an image. Note that the backlight system is employed in the embodiment, however, the image light may be output using a front-light system or reflection system.

Figure 3:
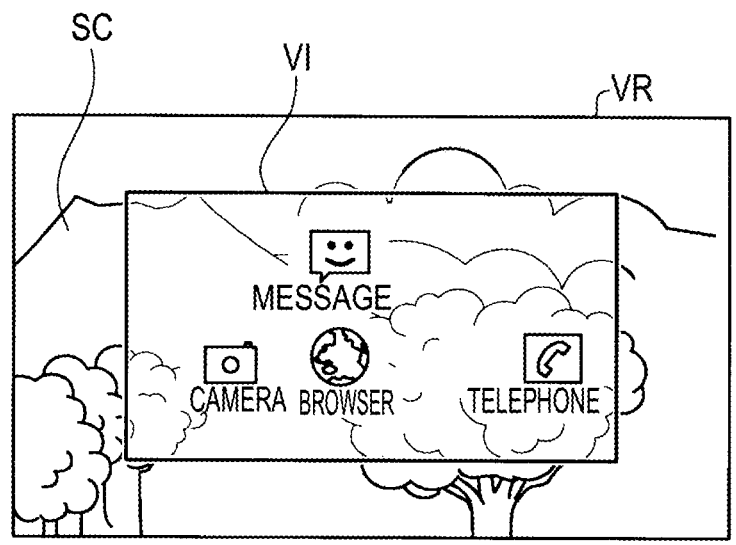
FIG. 3 is an explanatory diagram showing an example of augmented reality display by the HMD.

A-2. Regarding Augmented Reality Display:

FIG. 3 is an explanatory diagram showing an example of augmented reality display by the HMD 100. In FIG. 3, a view range VR of the user is exemplified. As described above, the image lights guided to both eyes of the user of the HMD 100 form an image on the retina of the user, and thereby, the user visually recognizes an image VI as augmented reality (AR). In the example of FIG. 3, the image VI is a standby screen of the OS of the HMD 100. Further, the optical image display parts 26, 28 transmit the lights from the outside world SC, and thereby, the user visually recognizes the outside world SC. In this manner, the user of the HMD of the embodiment may view the image VI and the outside world SC behind the image VI with respect to the part of the view range VR in which the image VI is displayed. Further, the user may view only the outside world SC with respect to the part of the view range VR1 in which the image VI is not displayed.

Figure 4:
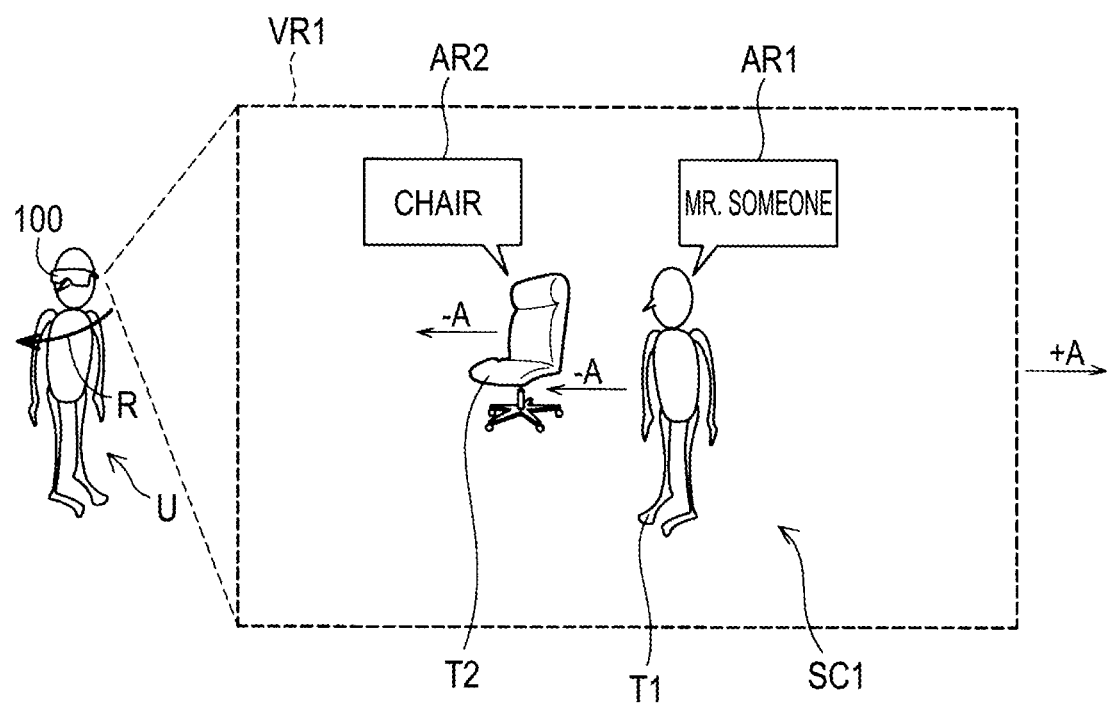
FIG. 4 is an explanatory diagram showing another example of augmented reality display by the HMD.

FIG. 4 is an explanatory diagram showing another example of augmented reality display by the HMD 100. In FIG. 4, a view range VR1 of a user U is exemplified. As shown in the drawing, the view range VR1 contains an outside world SC1 in which a human T1 and a chair T2 exist. Further, first and second augmented information AR1, AR2 as augmented reality are superimposed and displayed on the outside world SC1. The first augmented information AR1 is a balloon image displayed in correspondence with the position of the human T1, in which characters showing the name of the human T1 are written. The second augmented information AR2 is a balloon image displayed in correspondence with the position of the chair T2, in which characters "CHAIR" are written. The user U may visually recognize explanatory information on an object in the outside world SC1 visually recognized information through the optical image display parts 26, 28 by the first and second augmented information AR1, AR2. Hereinafter, the object provided with augmented information is referred to as "subject". That is, hereinafter, the human T1 and the chair T2 provided with the first and second augmented information AR1, AR2 are referred to as "subject T1", "subject T2".

In the state of FIG. 4, when the user U performs an action of turning the head to face the side as shown by an arrow R, the view range VR1 moves rightward by a predetermined amount, i.e., +A. In this case, the positions of the subjects T1, T2 within the view range VR1 relatively move by −A opposite to +A in the same amount of movement, and the display positions of the first and second augmented information AR1, AR2 also move in correspondence with the moved positions. The display of the augmented information and the control of the display positions are performed by the superimposition image display control part 164, the view range movement information acquisition part 166, and the subject movement information acquisition part 168 in FIG. 2. The respective parts 164, 166, 168 are functionally realized by the CPU 140 executing a predetermined program stored in the memory part 120. The details of the predetermined program will be explained as below.

Figure 5:
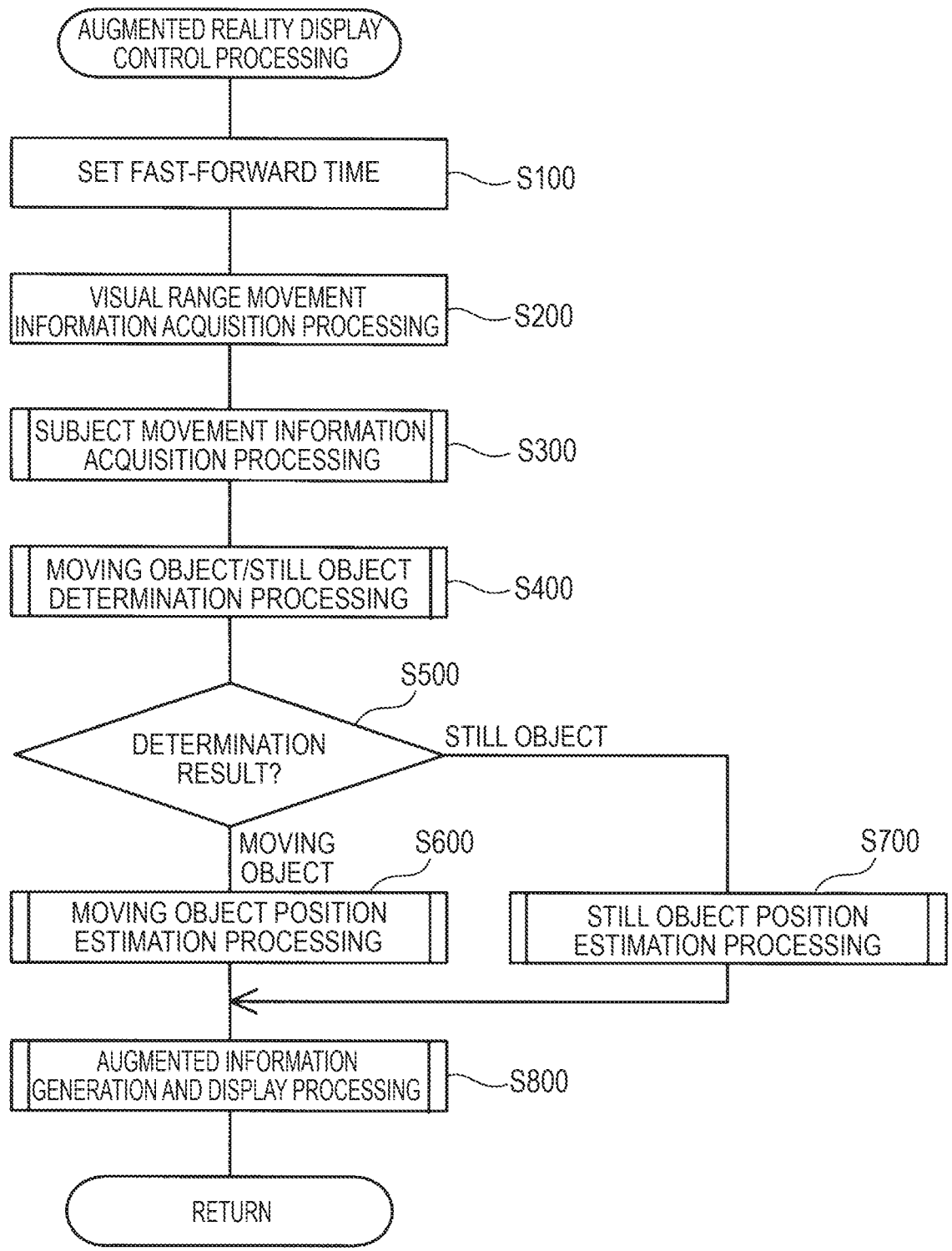
FIG. 5 is a flowchart showing augmented reality display control processing.

FIG. 5 is a flowchart showing augmented reality display control processing. The augmented reality display control processing corresponds to the predetermined program and repeatedly executed by the CPU 140 at predetermined time intervals. Here, the predetermined time refers to a time per one frame of the picture displayed by the HMD 100. When the processing is started, the CPU 140 first performs a setting of a fast-forward time as an initial setting (step S100). "Fast-forward time" refers to a time corresponding to a delay time of screen display taken until augmented information is redisplayed when the HMD 100 moves. The delay time may be obtained by an experiment or simulation in advance. In consideration of the obtained delay time, in the embodiment, the fast-forward time is set to a value within a range from 10 to 200 msec, e.g., 100 msec.

Then, the CPU 140 performs view range movement information acquisition processing of acquiring the information representing the motion of the image display unit 20 as view range movement information of the user U (step S200). In the view range movement information acquisition processing, accelerations in directions of three axes (x-axis, y-axis, z-axis) and an angular velocity of a rotation about a single axis (z-axis) are acquired from the nine-axis sensor 66 (FIGS. 1, 2) and the motion of the image display unit 20 is obtained from the information. As shown in FIG. 1, the x-axis, the y-axis, the z-axis are axes orthogonal to one another, and the z-axis is along the upward and downward directions of the image display unit 20 and the x-axis is along the leftward and rightward directions of the image display unit 20.

Figure 6:
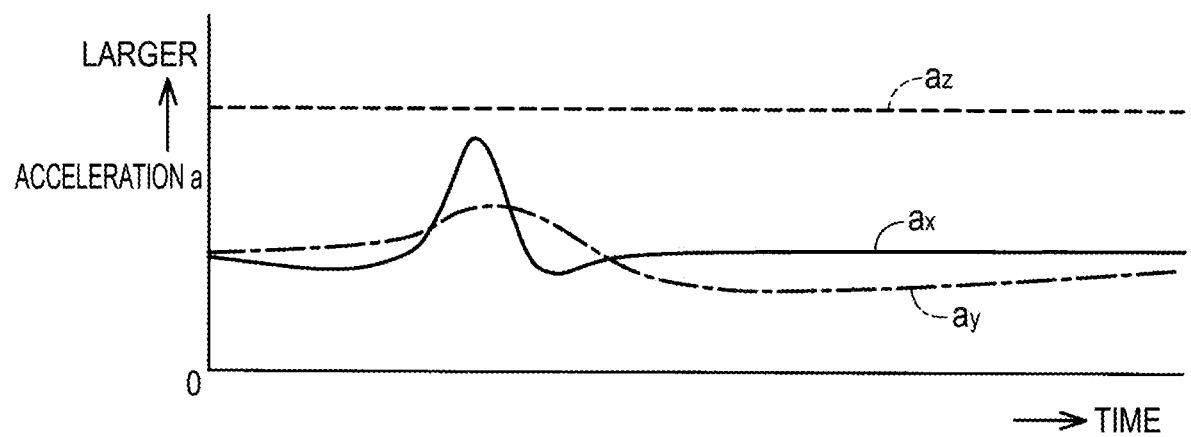
FIG. 6 is a graph showing accelerations ax, ay, az obtained from a nine-axis sensor.

FIG. 6 is a graph showing accelerations ax, ay, az obtained from the nine-axis sensor 66. The first acceleration ax is an acceleration in the x-axis direction, the second acceleration ay is an acceleration in the y-axis direction, and the third acceleration az is an acceleration in the z-axis direction.

Figure 7:
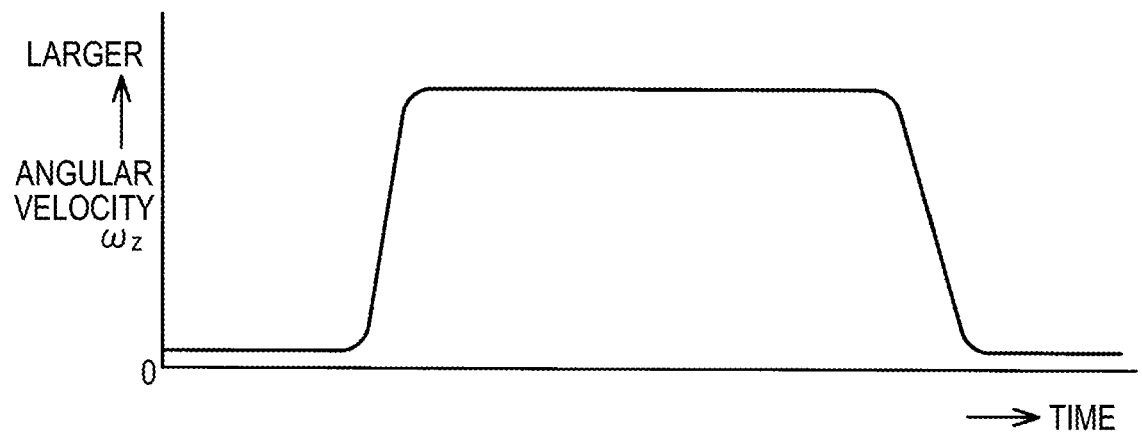
FIG. 7 is a graph showing an angular velocity ωz obtained from the nine-axis sensor.

FIG. 7 is a graph showing an angular velocity ωz obtained from the nine-axis sensor 66. The angular velocity ωz is an angular velocity of the rotation about the z-axis.

At step S200, the CPU 140 acquires the accelerations ax, ay, az shown in FIG. 6 and the angular velocity ωz shown in FIG. 7, and obtains changes of the position and the attitude and the velocity of the image display unit 20, i.e., the motion of the image display unit 20 from these information and time information. The motion of the image display unit 20 follows the motion of the head of the user and may be regarded as the motion of the view range of the user. Accordingly, the obtained motion of the image display unit 20 is additionally recorded in the view range movement information stored in the memory part 120. The view range movement information represents a history of the view range of the user up to date, and the view range movement information is updated to the latest status by additional recording of the motion of the image display unit 20 as described above.

Note that, at step S200, only the angular velocity ωz of the rotation about the z-axis is used as the angular velocity from the degree of freedom of rotation of the neck of the human body, however, the angular velocities of rotations about two axes or three axes including the angular velocity ωz may be used instead.

Subsequently, the CPU 140 performs subject movement information acquisition processing (step S300). The subject movement information acquisition processing is processing of acquiring information representing relative motions of the subjects T1, T2 to the motion of the image display unit 20 as subject movement information.

Figure 8:
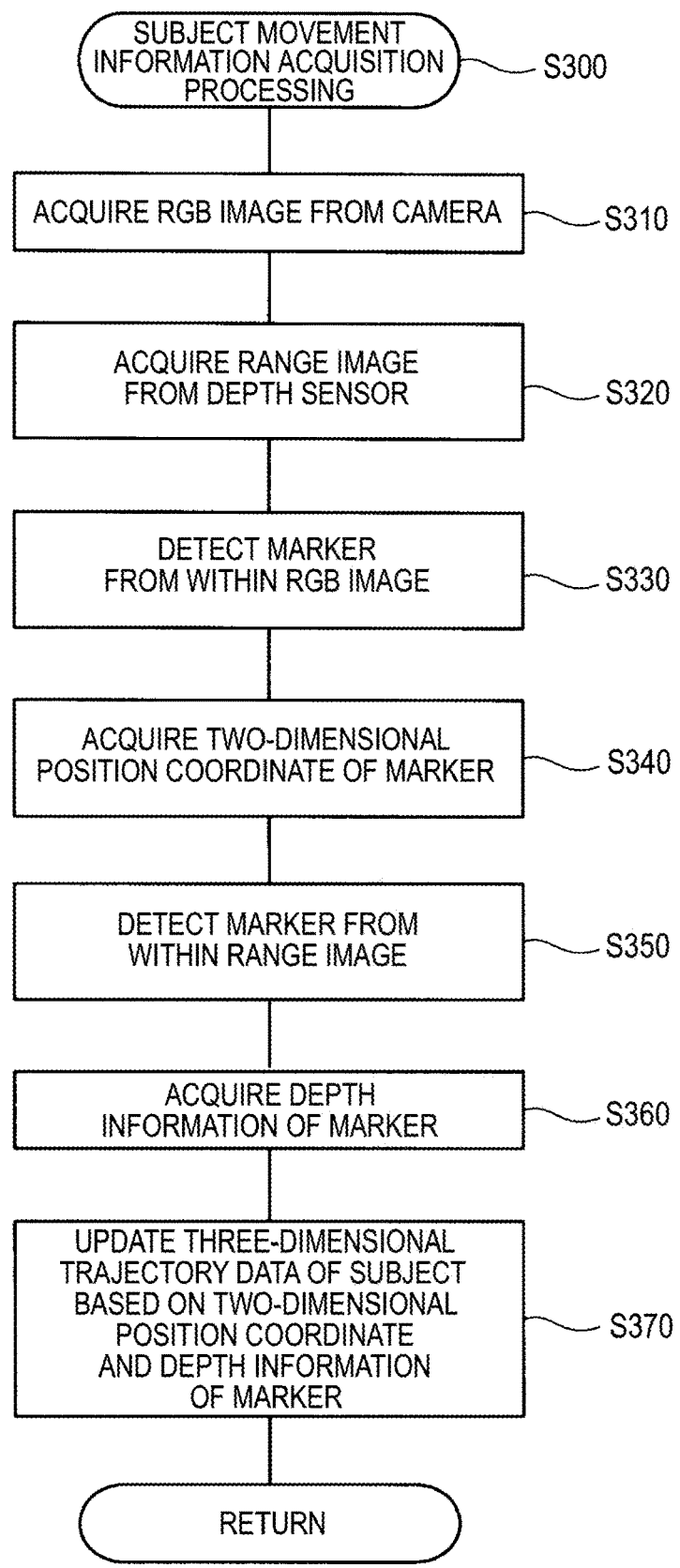
FIG. 8 is a flowchart showing details of subject movement information acquisition processing.

FIG. 8 is a flowchart showing details of the subject movement information acquisition processing. When the processing moves to the subject movement information acquisition processing, the CPU 140 first acquires an RGB image from the camera 61 (step S310) and acquires a range image from the depth sensor 62 (step S320).

Figure 9:
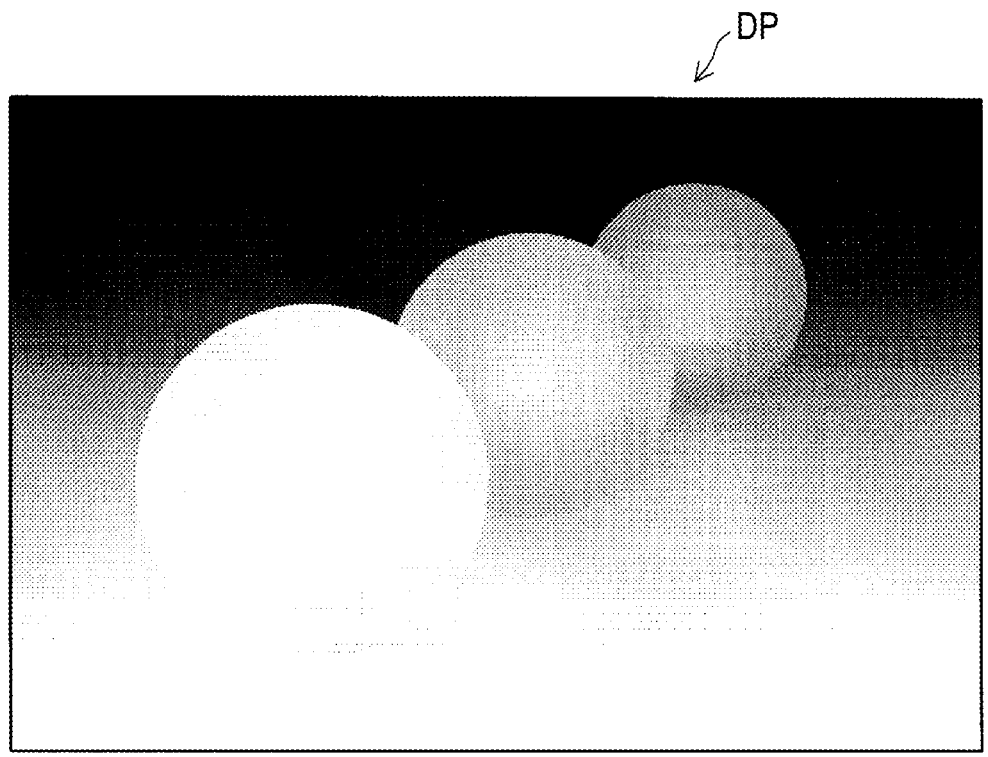
FIG. 9 is an explanatory diagram showing an example of a range image obtained by a depth sensor.

FIG. 9 is an explanatory diagram showing an example of the range image obtained by the depth sensor 62. As shown in the drawing, a range image DP is a grayscale image and shows depths (distances) in the respective pixels by grayscale. The range image DP is also referred to as "depth map".

After the execution of step S320 in FIG. 8, the CPU 140 detects a marker from within the RGB image acquired at step S310 (step S330), and acquires a two-dimensional position coordinate of the marker (step S340). In the embodiment, markers are attached to the subjects T1, T2 in advance and the markers are detected from within the RGB image, and thereby, the subjects T1, T2 inside the view range VR1 can be recognized.

Figure 10:
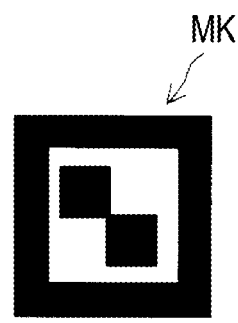
FIG. 10 is an explanatory diagram showing an example of a marker.

FIG. 10 is an explanatory diagram showing an example of a marker MK. As shown in the drawing, the marker MK is a two-dimensional marker in which a predetermined pattern image as an indicator for designating the position where the augmented information is displayed is printed. The respective subjects T1, T2 can be identified by the pattern images. At step S330 in FIG. 8, the marker MK is detected from within the RGB image and the position of the marker MK is acquired as a two-dimensional coordinate. The two-dimensional coordinate is a coordinate with the origin at one point of the four corners of the RGB image.

Note that, in the embodiment, the subjects can be recognized by attachment of the markers to the subjects T1, T2 in advance, however, shape patterns of "human" and "chair" as subjects may be stored in advance and the subjects may be recognized by pattern recognition in the RGB image instead.

After the execution of step S340, the CPU 140 detects the marker MK from within the range image acquired at step S320 (step S350), and acquires depth information of the marker (step S360). Note that, in place of the marker MK, shape patterns of subjects may be stored in advance and the subjects may be recognized by pattern recognition in the range image.

Then, the CPU 140 specifies the current three-dimensional position of the subject using the two-dimensional position coordinate of the marker acquired at step S340 and the depth information of the marker acquired at step S360 (in other words, regards the position of the marker as the position of the subject and specifies the three-dimensional position), additionally records the three-dimensional position in three-dimensional trajectory data stored in the memory part 120. The three-dimensional trajectory data represents a history of the relative position of the subject to the image display unit 20 up to date, and shows the position and the time rate of change of the position (i.e., velocity). The specified current three-dimensional position is additionally recorded, and thereby, the three-dimensional trajectory data is updated to the latest status.

After the execution of step S370, the CPU 140 once ends the subject movement information acquisition processing through "RETURN". Note that, according to the processing from step S340 to step S370, the processing is repeatedly performed with respect to each marker, i.e., with respect to each of the subjects T1, T2 and, as a result, three-dimensional trajectory data is generated with respect to each of the subjects T1, T2 inside the view range VR1. Thus generated three-dimensional trajectory data with respect to each of the subjects T1, T2 is once stored as the subject movement information in the memory part 120.

After ending the subject movement information acquisition processing in FIG. 8, then, the CPU 140 performs moving object/still object determination processing (FIG. 5: step S400). The moving object/still object determination processing is processing of determining whether the subjects T1, T2 are moving objects moving in the real space or still objects still in the real space.

Figure 11:
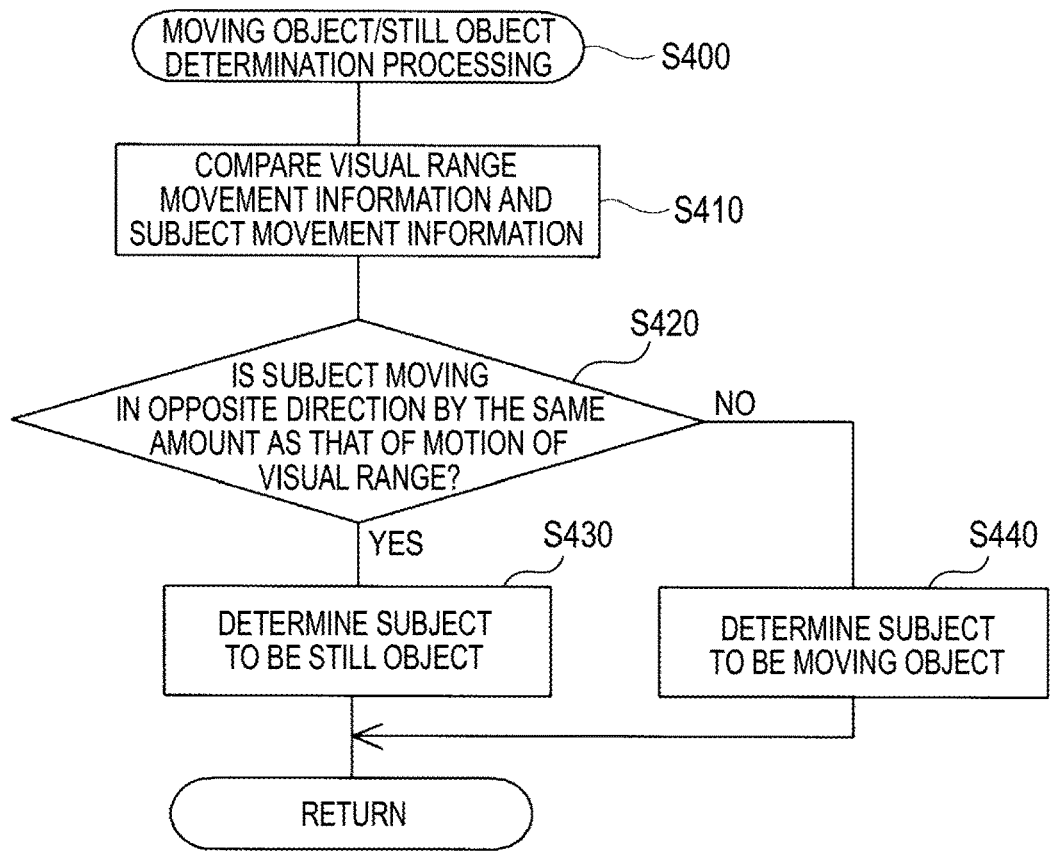
FIG. 11 is a flowchart showing details of moving object/still object determination processing.

FIG. 11 is a flowchart showing details of the moving object/still object determination processing. The processing moves to the moving object/still object determination processing, the CPU 140 first compares the view range movement information acquired at step S200 and the subject movement information acquired at step S300 (step S410), and determines whether or not the subjects T1, T2 move in the opposite direction by the same amount as that of the motion of the view range VR1 (step S420).

Figure 12:
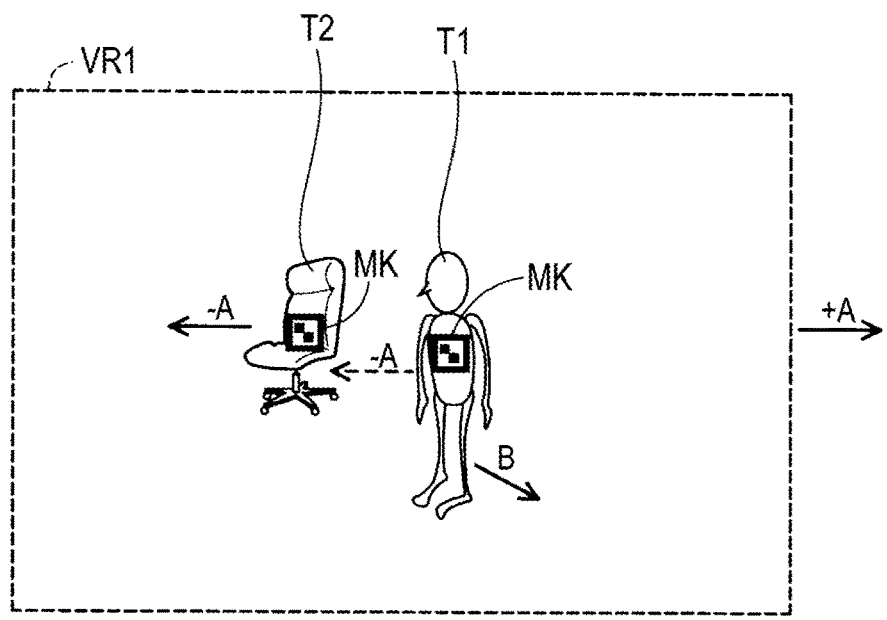
FIG. 12 is an explanatory diagram showing motions of subjects in a view range.

FIG. 12 is an explanatory diagram showing motions of the subjects T1, T2 in the view range VR1 exemplified in FIG. 4. As exemplified in FIG. 4, when the user U performs an action of turning the head to face the side, as shown in FIG. 12, the object T2 as a still object moves in the opposite direction by the same amount of movement as the motion +A of the view range VR1 (in other words, moves by −A) within the view range VR. Accordingly, the object T2 is positively determined at step S420 in FIG. 11. If the positive determination is made at step S420, the subject is determined to be "still object" (step S430). Note that the still object may be regarded as an object that relatively moves to the image display unit 20 depending only on the motion of the image display unit 20. Further, in FIG. 4, the case where the view range VR moves when the user U performs the action of facing to the side is explained, however, instead, there is a case where the view range VR moves when the user U moves by walking or the like. Also, in this case, the subject T2 as the still object moves in the opposite direction by the same amount of movement as that of the motion +A of the view range VR1, and is positively determined at step S420.

On the other hand, as shown in FIG. 12, in the view range VR1, the subject T1 moves by e.g. B different from −A. This is because the subject T1 is "moving object" that relatively moves to the image display unit 20 independent of the motion of the image display unit 20. Accordingly, the subject T1 as the moving object is negatively determined at step S420 in FIG. 11. If the negative determination is made at step S420, the subject is determined to be "moving object" (step S440).

The determination processing at step S420 may be regarded as processing of determining whether or not the view range movement information and the subject movement information are substantially matched. "Substantially matched" means that the motion of the image display unit 20 represented by the view range movement information and the relative motions of the subjects T1, T2 to the image display unit 20 represented by the subject movement information are in opposite directions and the differences in magnitude are within a threshold value. "Opposite directions" means that an angle between two motion vectors mapped on a display surface defined by the image display unit 20 or an imaginary plane parallel thereto falls within a predetermined range (e.g. within an error range) having a center at the 180°. If the view range movement information and the subject movement information are substantially matched, the motion of the image display unit 20 represented by the view range movement information and the motion of the subject represented by the subject movement information substantially coincide. After the execution of step S430 or S440, the CPU 140 once ends the moving object/still object determination processing through "RETURN".

After ending the moving object/still object determination processing in FIG. 11, then, the CPU 140 discriminates whether the determination result of the moving object/still object determination processing is "moving object" or "still object" (FIG. 5: step S500) and, if making a discrimination of "moving object", executes moving object position estimation processing (step S600). The moving object position estimation processing estimates a position to which the moving object has moved after the elapse of the fast-forward time set at step S100 from the present time. "Position" here refers to a relative position of the moving object to the image display unit 20.

FIG. 13 is a flowchart showing details of the moving object position estimation processing. When the processing moves to the moving object position estimation processing, the CPU 140 first reads the three-dimensional trajectory data on the subject as the moving object from the memory part 120 (step S610). The three-dimensional trajectory data is data stored in the memory part 120 at step S370 in FIG. 8, and the three-dimensional trajectory data on the subject as the moving object is read from the three-dimensional trajectory data.

Then, the CPU 140 estimates a movement velocity of the subject after the fast-forward time based on the three-dimensional trajectory data of the subject (moving object) read at step S610 (step S620). The fast-forward time is the value set at step S100 in FIG. 5. The above described estimation is performed using a Kalman filter in the embodiment. The Kalman filter is a known technology for estimation of an amount that temporally changes every minute (e.g. position and velocity of a certain object) from observation with a discrete error. Note that, in place of the Kalman filter, a configuration of estimating the movement velocity using another estimation theory such as Bayesian estimation or neural network may be employed.

Subsequently, the movement velocity calculated at step S610 is multiplied by the fast-forward time, and thereby, the movement position of the subject (moving object) after the fast-forward time is calculated (step S630). After the execution of step S630, the CPU 140 once ends the moving object position estimation processing through "RETURN".

FIG. 14 is an explanatory diagram conceptually showing a change of the movement position obtained by the moving object position estimation processing in FIG. 13. (a) in the drawing shows a motion of a subject represented by the three-dimensional trajectory data and an arrow tip P1 shows the current position of the subject. (b) in the drawing shows a movement position P2 of the subject after the fast-forward time obtained at step S630. After the fast-forward time, as shown by a broken line, the subject is estimated to move from the current position P1 to the position P2. Note that "motion", "position" here refer to relative "motion", "position" of the subject to the image display unit 20. Further, the position of the subject is an attachment position of the marker in the object in a strict sense.

At step S500 in FIG. 5, if the determination result of the moving object/still object determination processing is discriminated as "still object", still object position estimation processing is executed (step S700). The still object position estimation processing estimates a position to which the still object has moved after the elapse of the fast-forward time set at step S100 from the present time. "Position" here refers to a relative position of the still object to the image display unit 20.

Figure 15:
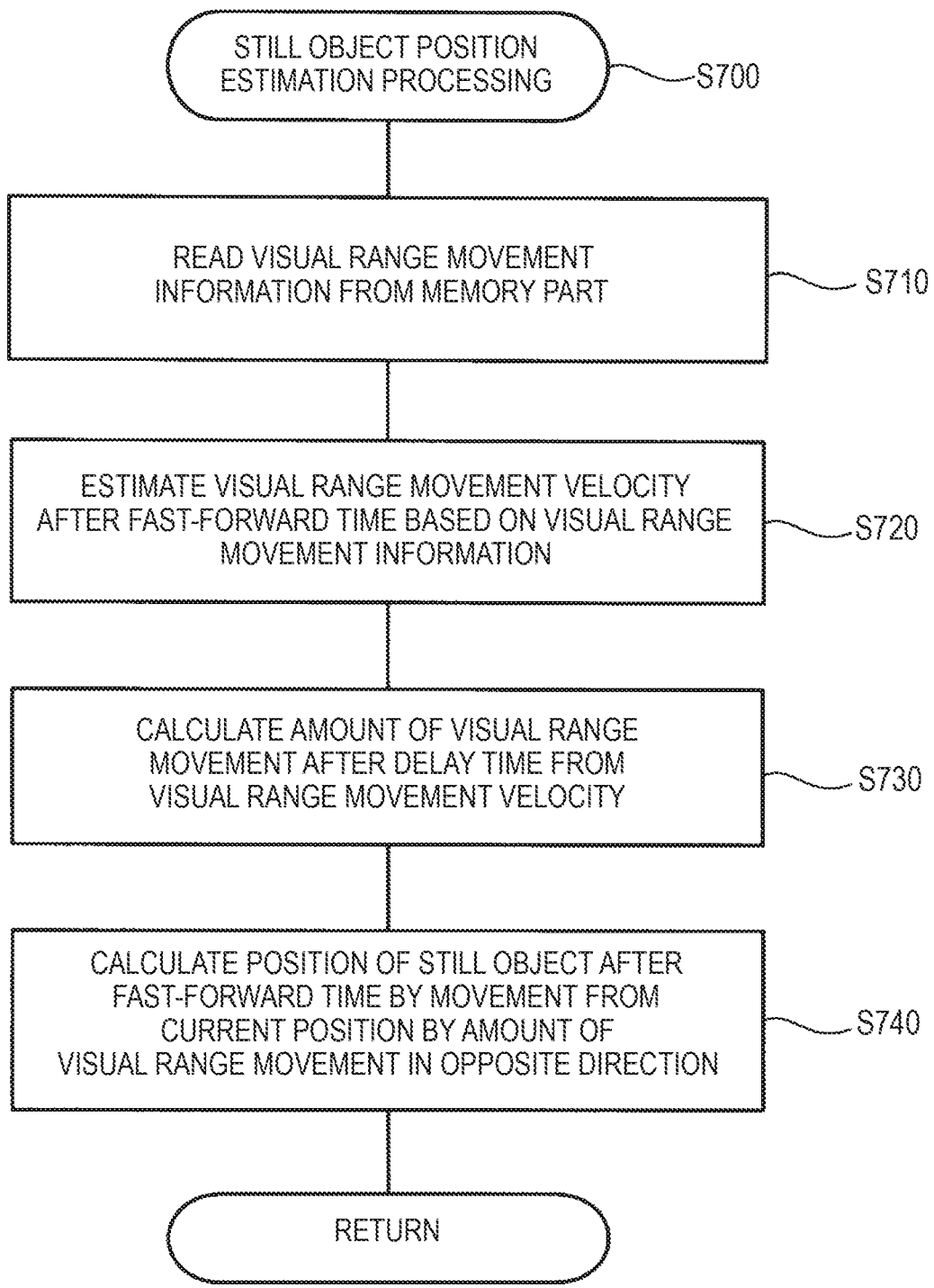
FIG. 15 is a flowchart showing details of still object position estimation processing.

FIG. 15 is a flowchart showing details of the still object position estimation processing. When the processing moves to the still object position estimation processing, the CPU 140 first reads the view range movement information from the memory part 120 (step S710). The view range movement information is information representing the motion of the view range VR1 stored in the memory part 120 at step S200 in FIG. 5.

Then, the CPU 140 estimates a movement velocity of the view range VR1 after the fast-forward time based on the view range movement information read at step S710 (S720). The fast-forward time is the value set at step S100 in FIG. 5. The above described estimation is performed using a Kalman filter like step S620 in FIG. 13. In place of the Kalman filter, a configuration of estimating the movement velocity using another estimation theory such as Bayesian estimation or neural network may be employed.

Subsequently, the movement velocity calculated at step S720 is multiplied by time, and thereby, an amount of movement of the view range VR1 after the fast-forward time is calculated (step S730). Then, the position of the subject (still object) after the fast-forward time is calculated by movement from the current position in the opposite direction by the amount of movement (step S740). After the execution of step S740, the CPU 140 once ends the still object position estimation processing through "RETURN".

Figure 16:
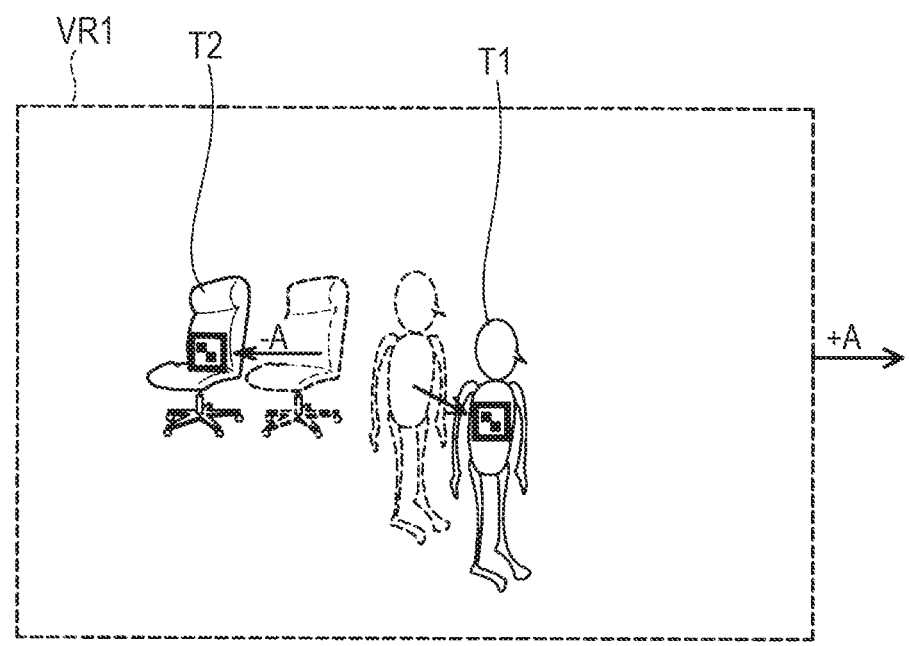
FIG. 16 is an explanatory diagram showing estimated positions of the subjects in the view range.

FIG. 16 is an explanatory diagram showing the estimated positions of the subjects T1, T2 in the view range VR1. According to the still object position estimation processing in FIG. 15, the subject T2 as the still object is estimated to move from the current position shown by broken lines to a position shown by solid lines in the opposite direction by the same amount of movement as that of the motion +A of the view range VR1 after the fast-forward time. On the other hand, according to the moving object position estimation processing in FIG. 13, the subject T1 as the moving object is estimated to move from the current position shown by broken lines to a position shown by solid lines estimated based on the history of the relative movement of the subject T2 to the image display unit 20 to the present time.

The moving object position estimation processing in FIG. 13 or the still object position estimation processing in FIG. 15 ends, then, the CPU 140 performs augmented information generation and display processing (FIG. 5: step S800). The augmented information generation and display processing is processing of displaying augmented information in correspondence with the position of the subject (the position of the marker) estimated by the moving object position estimation processing or the still object position estimation processing.

Figure 17:
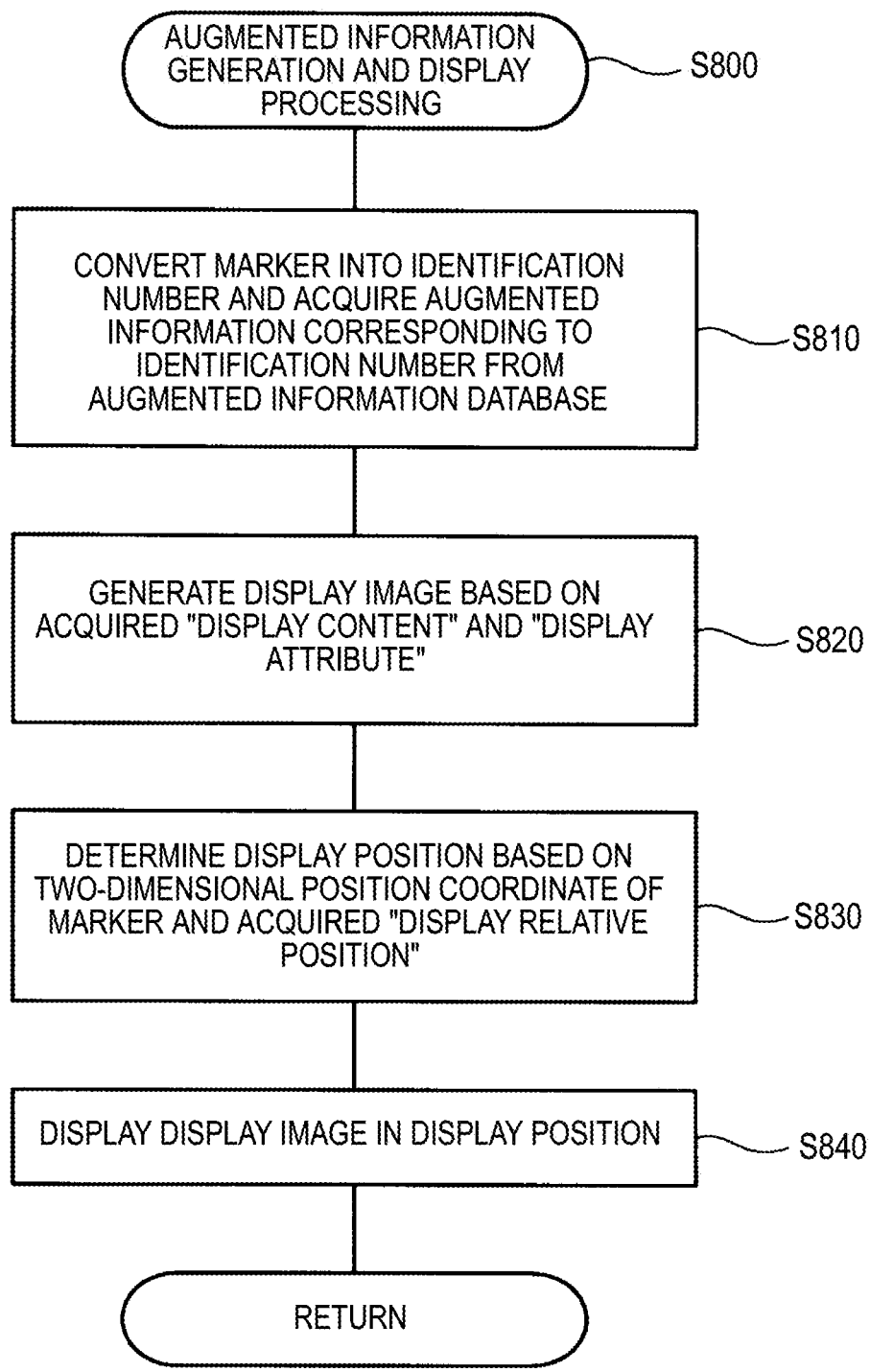
FIG. 17 is a flowchart showing details of augmented information generation and display processing.

FIG. 17 is a flowchart showing details of the augmented information generation and display processing. When the processing moves to the augmented information generation and display processing, the CPU 140 first converts the marker detected at step S330 into a marker identification number and performs processing of acquiring augmented information corresponding to the marker identification number from the augmented information database (step S810). The augmented information database is stored in the memory part 120 in advance.

Figures 18, 19:
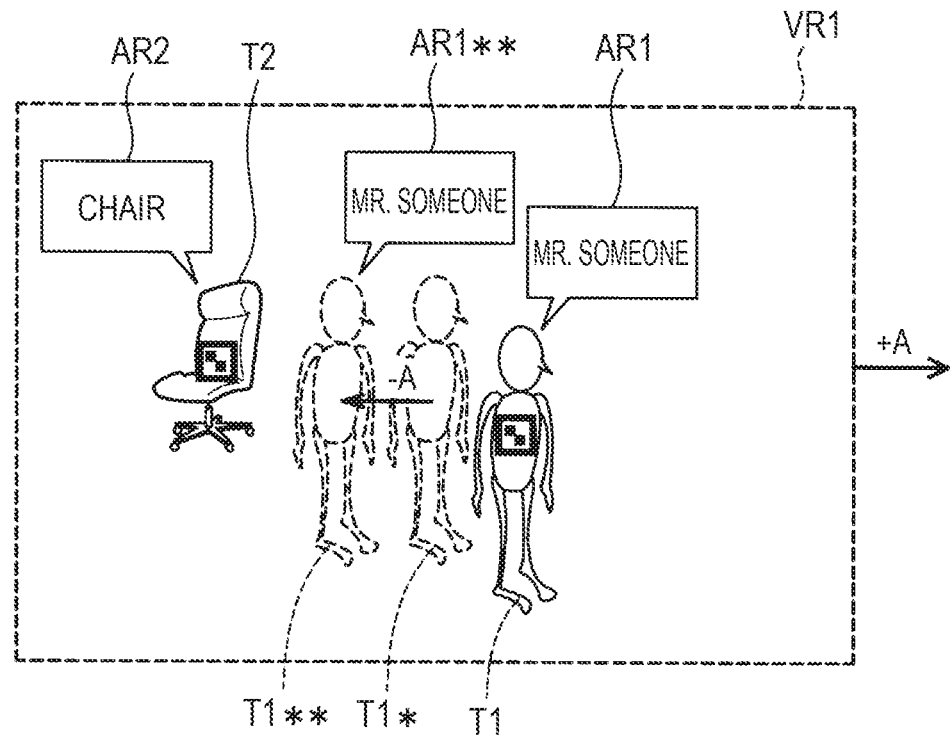
FIG. 18 is an explanatory diagram showing an example of a data structure of an augmented information database.
FIG. 19 is an explanatory diagram showing augmented information displayed by the augmented reality display control processing.

FIG. 18 is an explanatory diagram showing an example of a data structure of an augmented information database DB. The augmented information database DB has a plurality of records including four items C1, C2, C3, C4 of "marker identification number", "display content", "display attribute", "display relative position". One record corresponds to each marker. In the item C1 of "marker identification number", integer numbers equal to or larger than one for identification of the marker are stored. In the item C2 of "display content", text data representing contents of the displayed augmented information are stored. In the item C3 of "display attribute", attributes with respect to the displayed augmented information are stored, and an item C31 of "balloon color" and an item C32 of character size are included. In the item C4 of "display position", relative display positions of augmented information to the markers are stored. The display position is defined by e.g. a coordinate of the lower left corner and a coordinate the upper right corner of the balloon image.

At step S810, specifically, the image pattern of the marker detected at step S330 is converted into the marker identification number and the augmented information database DB is searched using the marker identification number as a key. A record having the item C1 of "marker identification number" that coincides with the key is selected and the data of the respective items C2, C3, C4 of "display content", "display attribute", "display relative position" contained in the record are read from the augmented information database DB as augmented information.

Then, the CPU 140 generates a display image based on the data of the respective items C2, C3 of "display content" and "display attribute" acquired at step S810 (step S820). Subsequently, the CPU 140 determines the display position of the augmented information based on the position of the subject (the position of the marker) estimated by the moving object position estimation processing or the still object position estimation processing and the data of the item C4 of "display relative position" (step S830). Then, the CPU 140 displays the display image generated at step S820 in the display position (step S840). After the execution of step S840, the CPU 140 ends the augmented information generation and display processing, and ends the augmented reality display control processing.

The view range movement information acquisition part 166 in FIG. 2 is realized by the CPU 140 and the processing at step S200 in FIG. 5 in the augmented reality display control processing. The subject movement information acquisition part 168 in FIG. 2 is realized by the processing at step S300 in FIG. 5. The superimposition image display control part 164 in FIG. 2 is realized by the processing at step S400, S500, S600, and S800 in FIG. 5.

A-3. Regarding Advantages of Embodiment:

FIG. 19 is an explanatory diagram showing augmented information AR1, AR2 displayed by the augmented reality display control processing. The subjects T1, T2 shown by solid lines in the drawing are located in the positions after the fast-forward time estimated by the moving object position estimation processing and the still object position estimation processing. The first augmented information AR1 is displayed in correspondence with the position of the marker attached to the subject T1, and the second augmented information AR2 is displayed in correspondence with the position of the marker attached to the subject T2.

Therefore, according to the HMD 100 of the embodiment, in either case where the subject in the outside world transmissively visually recognized is the subject T1 as the moving object moving in the real space or the subject T2 as the still object still in the real space, even when the delay time corresponding to the fast-forward time is taken for displaying the augmented information, the respective augmented information AR1, AR2 is displayed without misregistration with respect to the respective subjects T1, T2.

As shown in FIG. 19, when the view range VR1 moves rightward by a predetermined amount, i.e., +A, the current subject (T1* in the drawing) relatively moves in the opposite direction by the same amount of movement as that of +A (in other words, moves by −A), however, during the movement of the view range VR1, the subject T1 as the moving object may move to a position different from −A. That is, the subject T1 as the moving object may relatively move to the image display unit 20 independent of the motion of the image display unit 20. In this case, according to the head mounted display of related art, after the above described movement of the view range VR1, the display position is changed so that augmented information AR1 may be displayed in correspondence with the position of the subject (T1 in the drawing) that has relatively moved by −A, and thereby, significant misregistration occurs between the subject T1 and the augmented information AR1** after the movement of the view range VR1. On the other hand, according to the HMD 100 of the embodiment, as described above, no misregistration occurs between the subject T1 and the augmented information AR1. Therefore, according to the HMD 100 of the embodiment, even when the delay time is taken for displaying the augmented information, in either case of a moving object or a still object, an advantage that the augmented information may be displayed with misregistration is achieved.

Further, according to the HMD 100 of the first embodiment, the determination as to whether the subject is a moving object or a still object is performed based on the subject movement information (three-dimensional trajectory data) representing the history of the relative movement of the subject to the image display unit 20 and the view range movement information representing the history of the motion of the image display unit 20. Accordingly, the determination of a moving object or a still object may be easily configured without providing a new sensor.

B. Modified Examples

Note that the invention is not limited to the above described first embodiment and modified examples thereof, but can be embodied in various modes without departing the scope thereof. For example, the following modified examples can be employed.

B-1. Modified Example 1

In the first embodiment and the modified examples thereof, the relative movement of the subject to the image display unit 20 is detected by the camera 61 and the depth sensor 62 provided in the image display unit 20, however, instead, a configuration in which a motion sensor that detects an acceleration and an angular velocity or an acceleration is provided in the subject and the HMD receives the detection signal of the motion sensor via wireless communication may be employed. According to the modified example, the relative movement of the subject as a moving object to the image display unit 20 can be detected with higher accuracy.

B-2. Modified Example 2

In the first embodiment and the modified examples thereof, the relative movement of the subject to the image display unit 20 is detected by the camera 61 and the depth sensor 62 provided in the image display unit 20, however, instead, a configuration in which one or more of various terminals including a BLE (Bluetooth Low Energy) terminal of iBeacon (registered trademark), Wi-Fi (registered trademark) terminal, GPS terminal are provided in the subject and the HMD receives the signals from these terminals may be employed. According to these technologies, the relative position of the HMD to various terminals can be detected. Therefore, the relative movement of the subject as a moving object to the image display unit 20 can be detected with high accuracy.

B-3. Modified Example 3

In the first embodiment, a configuration in which the view range movement information acquired at step S200 is transmitted to another head mounted display apparatus via the wireless communication part 132 may be employed. According to the modified example 3, the motions of the mutual display units may be exchanged between the other head mounted display apparatus and itself by the simple configuration.

B-4. Modified Example 4

In the first embodiment, as the augmented information, balloon figures in which characters are written are used, however, this is just an example and can be replaced by various forms. Characters, figures, images, moving pictures, and combinations of them may be employed. Further, the images may be 3D images. The depths and sizes of the 3D images may be changed based on distance information of subjects to be associated with.

B-5. Modified Example 5

In the first embodiment, the display modes (color, size, switch between highlighted display/non-highlighted display, with or without blinking, etc.) of augmented information are the same in the case where the subject is a still object or a moving object, however, instead, the display modes of the augmented information may be changed. For example, in FIG. 19, the second augmented information AR2 attached to the subject T2 as a still object may be normally displayed and the first augmented information AR1 attached to the subject T1 as a moving object may be displayed with blinking. According to the configuration, the subject in movement may be easily visually recognized.

B-6. Modified Example 6

In the first embodiment, the time in the future at which the position of the subject is estimated is after the fast-forward time and the fast-forward time is set to a constant time, however, instead, a configuration in which the fast-forward time is variable and adjusted to an appropriate time may be employed. Specifically, when the RGB image is acquired from the camera at step S310, time stamp information is added to the RGB image and at least a part of the captured RGB image is displayed on the image display unit 20 with the time stamp information. The image on the displayed screen is captured and the time stamp information on the screen is subtracted from the current time stamp information, and thereby, the delay time is calculated. The delay time is set as the fast-forward time. The processing is performed e.g. at each time when the HMD is turned on and the fast-forward time is adjusted to an appropriate time. According to the modified example, misregistration between the subject and the augmented information occurring in the delay time of image display may be solved more reliably.

B-7. Other Modified Examples

In the above described embodiment, the configuration of the head mounted display is exemplified. However, the configuration of the head mounted display can be arbitrarily determined without departing from the scope of the invention, and e.g. addition, deletion, conversion, etc. of the respective configuration parts may be made.

The assignment of the component elements to the control unit and the image display unit in the above described embodiment is just an example and various modes can be employed. For example, the following modes may be employed: (i) a mode in which a processing function of a CPU, memory, etc. is mounted on the control unit and only a display function is mounted on the image display unit; (ii) a mode in which a processing function of a CPU, memory, etc. is mounted on both the control unit and the image display unit; (iii) a mode in which the control unit and the image display unit are integrated (for example, a mode with the image display unit including the control unit functioning as a spectacle-shaped wearable computer); (iv) a mode using a smartphone or portable game machine in place of the control unit; and (v) a mode in which the control unit and the image display unit are adapted to be wirelessly communicated and wirelessly charged without connecting parts (cords).

In the above described embodiment, for convenience of explanation, the control unit includes the transmitting part and the image display unit includes the receiving part. However, both the transmitting part and the receiving part of the above described embodiment have a function capable of interactive communications and may function as transmitting and receiving parts. Further, for example, the control unit shown in FIG. 2 is connected to the image display unit via a wired signal transmission path. However, the control unit and the image display unit may be connected by connection via a wireless signal transmission path such as wireless LAN, infrared communication, or Bluetooth (registered trademark).

For example, the configurations of the control unit and the image display unit shown in the above described embodiment may be arbitrarily changed. Specifically, for example, the touch pad may be omitted from the control unit and only the arrow key may be used for operation. Or, another operation interface such as an operation stick may be provided in the control unit. Or, the control unit may be adapted to be connectable to a device such as a keyboard and mouse and receive input from the keyboard and the mouse. Or, for example, instead of the operation input using the touch pad and the arrow key, operation input by a foot switch (a switch operated by a foot of the user) may be acquired. For example, a line of sight sensing part such as an infrared sensor may be provided in the image display unit and senses the line of side of the user and operation input by a command associated with the motion of the line of sight may be acquired. For example, a gesture of the user may be sensed using a camera and operation input by a command associated with the gesture may be acquired. For gesture sensing, a finger tip of the user, a ring worn on the hand of the user, a medical device in the hand of the user, or the like may be used as a mark for motion detection. The operation input by the foot switch and the line of sign can be acquired, and thereby, even in a work for which the user is difficult to release hands, the input information acquisition part may acquire the operation input from the user.

Figure 20A:
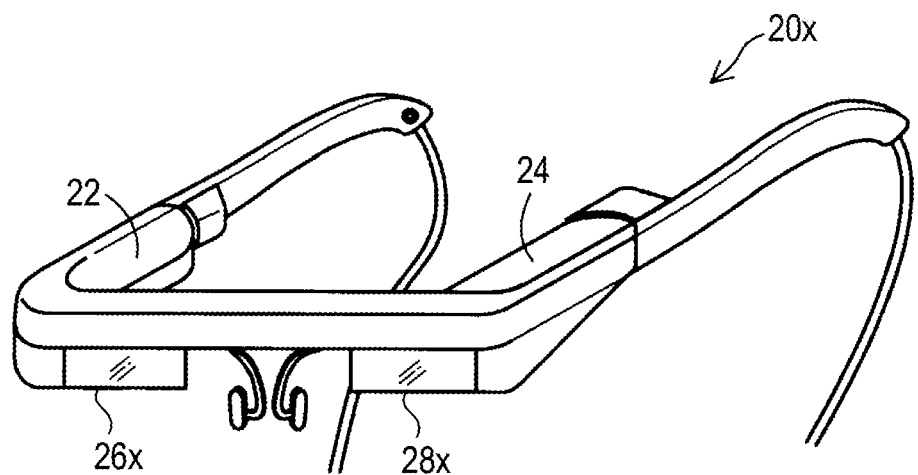
FIG. 20 is an explanatory diagram showing appearance configurations of the HMD in modified examples.
Figure 20B:
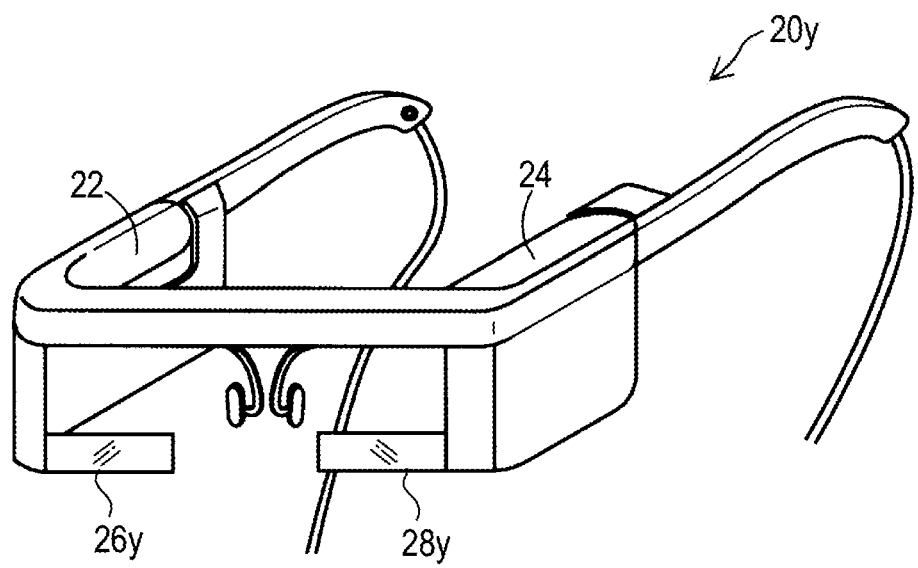

FIG. 20 is an explanatory diagram showing appearance configurations of the HMD in modified examples. In the case of the example in FIG. 20(A), an image display unit 20x includes a right optical image display part 26x in place of the right optical image display part 26, and a left optical image display part 28x in place of the left optical image display part 28. The right optical image display part 26x and the left optical image display part 28x are formed to be smaller than the optical members of the above described embodiment, and provided obliquely above the right eye and the left eye of the user when the HMD is worn. In the case of the example in FIG. 20(B), an image display unit 20y includes a right optical image display part 26y in place of the right optical image display part 26, and a left optical image display part 28y in place of the left optical image display part 28. The right optical image display part 26y and the left optical image display part 28y are formed to be smaller than the optical members of the above described embodiment, and provided obliquely below the right eye and the left eye of the user when the HMD is worn. As described above, it is sufficient that the optical image display parts are placed near the eyes of the user. Further, the sizes of the optical members forming the optical image display parts are arbitrary, and an HMD having a configuration in which the optical image display parts cover only parts of the eyes of the user, in other words, the optical image display parts do not completely cover the eyes of the user may be realized.

For example, the head mounted display is the binocular-type head mounted display, however, a monocular-type head mounted display may be employed. Or, a non-transmissive-type head mounted display by which transmission of the outside world scenery is blocked when the user wears the head mounted display may be employed.

For example, the functional parts of the image display unit, the display control part, the sound processing part, etc. are described to be realized by the CPU developing and executing the computer programs stored in a ROM or hard disk in a RAM. However, these functional parts may be formed using an ASIC (Application Specific Integrated Circuit) designed for realizing the functions.

For example, in the above described embodiment, the head mounted display having the image display unit worn like spectacles is employed, however, the image display unit may be a normal flat-type display device (liquid crystal display device, plasma display device, organic EL display device, or the like). Also, in this case, the connection between the control unit and the image display unit may be connection via a wired signal transmission path or connection via a wireless signal transmission path. In the configuration, the control unit may be used as a remote for the normal flat-type display device.

Or, as the image display unit, in place of the image display unit worn like spectacles, for example, an image display unit having another shape like an image display unit worn like a hat may be employed. Further, an earphone of ear hanging type or headband type may be employed or omitted. Or, for example, a head-up display (HUD) mounted on a vehicle of an automobile or airplane may be formed. Or, for example, a head mounted display built in a body protector such as a helmet may be formed.

For example, in the above described embodiment, the display drive part includes the backlight, the backlight control part, the LCD, the LCD control part, and the projection system. However, the above described embodiment is just an exemplification. The display drive part may include a configuration part for realizing another system with or in place of these configuration parts. For example, the display drive part may include an organic EL (organic electro-luminescence) display, an organic EL control part, and a projection system. For example, the display drive part may use a DMD (digital micromirror device) or the like in place of the LCD. For example, the display drive part may include a signal light modulation part including a color light source for generating respective color lights of RGB and a relay lens, a scanning system including an MEMS mirror, and a drive control circuit that drives them. As described above, even when the organic EL, the DMD, the MEMS mirror are used, "light-exiting region in display drive part" remains a region in which image light is actually output from the display drive part, and the same advantages as those of the above described embodiment may be obtained by controlling the light-exiting regions in the respective devices (display drive parts) in the same manner as that of the above described embodiment. Or, for example, the display drive part may include one or more lasers that output lasers with intensity according to pixel signals to the retinas of the user. In this case, "light-exiting region in display drive part" refers to a region in which a laser beam representing an image is actually output from the display drive part. The same advantages as those of the above described embodiment may be obtained by controlling the laser beam exiting regions in the respective lasers (display drive parts) in the same manner as that of the above described embodiment.

The invention is not limited to the above described embodiment and modified examples, but may be realized in various configurations without departing from the scope thereof. For example, the technical features in the embodiment, the example, and the modified examples corresponding to the technical features of the respective embodiments described in Summary of Invention can be replaced or combined as appropriate for solving part or all of the above described problems or achieving part or all of the above described advantages. Further, the technical features can be deleted as appropriate unless the features are explained as being essential in the specification.

REFERENCE SIGNS LIST

10 . . . control unit (controller)
12 . . . lighting part
14 . . . touch pad
16 . . . arrow key
18 . . . power switch
20 . . . image display unit
21 . . . right holding part
22 . . . right display drive part
23 . . . left holding part
24 . . . left display drive part
26 . . . right optical image display part
28 . . . left optical image display part
30 . . . earphone plug
32 . . . right earphone
34 . . . left earphone
40 . . . connecting part
42 . . . right cord
44 . . . left cord
46 . . . coupling member
48 . . . main body cord
51 . . . transmitting part
52 . . . transmitting part
53 . . . receiving part
54 . . . receiving part
61 . . . camera
62 . . . depth sensor
110 . . . input information acquisition part
100 . . . head mounted display apparatus (HMD)
120 . . . memory part
130 . . . power source
132 . . . wireless communication part
140 . . . CPU
160 . . . image processing part
162 . . . display control part
164 . . . superimposition image display control part
166 . . . view range movement information acquisition part
168 . . . subject movement information acquisition part
170 . . . sound processing part
180 . . . interface
201 . . . right backlight control part
202 . . . left backlight control part 211 . . . right LCD control part
212 . . . left LCD control part
221 . . . right backlight
222 . . . left backlight
241 . . . right LCD
242 . . . left LCD
251 . . . right projection system
252 . . . left projection system
261 . . . right light guide plate
262 . . . left light guide plate
T1, T2 . . . subject
MK . . . marker
SC1 . . . outside world
AR1, AR2 . . . augmented information

The invention claimed is:

1. A head mounted display apparatus including an image display by which an outside world can be transmissively visually recognized, the head mounted display apparatus comprising:
   a camera configured to capture an image of an outside world including a subject;
   a motion sensor configured to detect an acceleration and angular velocity of the head mounted apparatus; and
   a processor programmed to:
      display, via the image display, a predetermined image in correspondence with a position of the subject in the outside world that can be transmissively visually recognized through the image display;
      detect, as a view range movement information, a motion of the image display based on output from the motion sensor;
      detect, as subject movement information, a relative motion of the subject to the image display based on the image captured by the camera;
      when the detected view range movement information and the detected subject movement information are substantially not matched, estimate a relative position of the subject to the image display after a predetermined time based on at least the subject movement information via a filter algorithm;
      determine a display position of the predetermined image based on the estimated relative position; and
      display the predetermined image at the determined display position on the image display.

2. The head mounted display apparatus according to claim 1, wherein the predetermined image is augmented information as augmented reality provided to the subject.

3. The head mounted display apparatus according to claim 1, wherein the processor is further programmed to:
   in response to the detected view range movement information and the detected subject movement information being substantially matched, estimate a relative position of the subject to the image display after a predetermined time based on the view range movement information, and
   determine a display position of the predetermined image based on the estimated relative position.

4. The head mounted display apparatus according to claim 1, wherein the processor receives a detection signal of another motion sensor provided in the subject via wireless communication.

5. The head mounted display apparatus according to claim 1, wherein the processor receives a signal from a wireless communication terminal provided in the subject.

6. The head mounted display apparatus according to claim 1, wherein the processor varies the predetermined time.

7. The head mounted display apparatus according to claim 1, wherein the processor transmits the view range movement information to another head mounted display apparatus.

8. The head mounted display apparatus according to claim 1, wherein the processor is further programmed to:
   determine a movement velocity of the subject,
   calculate a future position of the subject by multiplying the determined movement velocity of the subject with a fast-forward time, and
   estimate the relative position of the subject to the image display after the predetermined time based on the calculated future position of the subject.

9. A head mounted display apparatus comprising:
   an image display by which an outside world can be transmissively visually recognized;
   a camera configured to capture an image of an outside world including a subject;
   a motion sensor configured to detect an acceleration and angular velocity of the head mounted apparatus; and
   a processor programmed to:
      determine, based on an output from the camera and the motion sensor, whether a subject in the outside world is a moving object relatively moving to the image display independent of a motion of the image display,
      determine, based on an output from the camera and the motion sensor, whether a still object relatively moving to the image display depending on only the motion of the image display, and
      display, via the image display, a predetermined image in correspondence with a position of the subject relative to the image display after a predetermined time via a filter algorithm in response to: (i) the subject in the outside world being the moving object relatively moving to the image display independent of the motion of the image display, or (ii) the still object relatively moving to the image display depending on only the motion of the image display.

10. A control method for a head mounted display apparatus including an image display by which an outside world can be transmissively visually recognized, the method comprising:
    displaying, via the image display, a predetermined image in correspondence with a position of a subject in the outside world that can be transmissively visually recognized through the image display;
    detecting, by a motion sensor, an acceleration and angular velocity of the image display as view range movement information;
    detecting, by a camera capturing an image of the outside world, a relative motion of the subject to the image display as subject movement information;
    when the detected view range movement information and the detected subject movement information are substantially not matched, estimating a relative position of the subject to the image display after a predetermined time based on at least the subject movement information via a filter algorithm;
    determining a display position of the predetermined image based on the estimated relative position; and
    displaying the predetermined image at the determined display position on the image display.

11. A non-transitory computer readable storage medium storing a computer program that causes a processor of a head mounted display apparatus including an image display by which an outside world can be transmissively visually recognized, to perform steps comprising:

displaying, via the image display, a predetermined image in correspondence with a position of a subject in the outside world that can be transmissively visually recognized through the image display;

detecting, by a motion sensor, an acceleration and angular velocity of the image display as view range movement information;

detecting, by a camera capturing an image of the outside world, a relative motion of the subject to the image display as subject movement information;

when the detected view range movement information and the detected subject movement information are substantially not matched, estimating a relative position of the subject to the image display after a predetermined time based on at least the subject movement information via a filter algorithm;

determining a display position of the predetermined image based on the estimated relative position; and displaying the predetermined image at the determined display position on the image display.

* * * * *